(12) United States Patent
King et al.

(10) Patent No.: US 12,056,772 B2
(45) Date of Patent: Aug. 6, 2024

(54) DESIGNED EXPERIMENTS FOR APPLICATION VARIANTS

(71) Applicant: State Farm Mutual Automobile Insurance Company, Bloomington, IL (US)

(72) Inventors: Garren King, Eureka, IL (US); Justin Devore, Atlanta, IL (US); Holly Kay Sanderson, Bloomington, IL (US); Barbara Williford, Bloomington, IL (US); Andrew Mathes, Eureka, IL (US); Mehron Beheshti, Hoffman Est, IL (US); Alexandria Pokorny, Normal, IL (US); Merril Myers, Bloomington, IL (US); Andy Pulkstenis, Mahomet, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 91 days.

(21) Appl. No.: 17/737,647

(22) Filed: May 5, 2022

(65) Prior Publication Data
US 2022/0358598 A1    Nov. 10, 2022

Related U.S. Application Data

(60) Provisional application No. 63/184,549, filed on May 5, 2021.

(51) Int. Cl.
*G06Q 40/08*  (2012.01)
*G06Q 10/0639*  (2023.01)

(52) U.S. Cl.
CPC ....... *G06Q 40/08* (2013.01); *G06Q 10/06393* (2013.01)

(58) Field of Classification Search
CPC .................. G06Q 40/08; G06Q 10/06393
USPC ............................................ 705/3–44
See application file for complete search history.

(56) References Cited

U.S. PATENT DOCUMENTS

| | | |
|---|---|---|
| 8,160,917 B1 * | 4/2012 | Solanki ............ G06Q 30/02 705/7.29 |
| 9,449,281 B2 | 9/2016 | Basel et al. |
| 10,192,172 B2 | 1/2019 | Chan et al. |
| 10,521,334 B2 | 12/2019 | Young |
| 10,713,594 B2 | 7/2020 | Szeto et al. |
| 10,733,078 B2 | 8/2020 | Mordo et al. |

(Continued)

OTHER PUBLICATIONS

Xu et al., "A survey of Deep Learning for Electronic Health Records", Applied Sciences 12.22: 11709, MDPI AG . (Year: 2022).*

(Continued)

*Primary Examiner* — Frantzy Poinvil
(74) *Attorney, Agent, or Firm* — Lee & Hayes, P.C.

(57) ABSTRACT

Variants of an application, such as user interface variants and/or logic variants, can be used in a production environment as part of a designed experiment. An experiment manager can cause the application to operate based on different variants for different users and/or instances of input data. Synchronous and/or asynchronous results can be collected that indicate impacts of the variants at the application and/or other downstream systems. Such asynchronous and/or synchronous results can be used to prove or disprove a hypothesis associated with the designed experiment.

20 Claims, 6 Drawing Sheets

(56) References Cited

U.S. PATENT DOCUMENTS

| | | | |
|---|---|---|---|
| 2015/0149260 A1* | 5/2015 | Martin, II | G06Q 10/06393 |
| | | | 705/7.39 |
| 2016/0125344 A1* | 5/2016 | Carmeli | G06Q 10/06393 |
| | | | 705/7.39 |
| 2016/0352847 A1 | 12/2016 | Frasca et al. | |
| 2018/0196400 A1* | 7/2018 | Kobayashi | G06Q 50/06 |
| 2020/0065726 A1* | 2/2020 | Gibbons | G06F 40/174 |
| 2020/0103886 A1 | 4/2020 | Gandenberger | |
| 2020/0380417 A1* | 12/2020 | Briancon | G06Q 10/06316 |
| 2020/0387834 A1 | 12/2020 | Hackett | |
| 2021/0117977 A1 | 4/2021 | Kim et al. | |
| 2021/0241202 A1* | 8/2021 | Tichy | H04L 9/3239 |

OTHER PUBLICATIONS

Thygs, Fabian, "Automation techniques to support experimental investigation during systematic downstream process development", Schriftenreihe Anlagen und Prozesstechnik, TU Dortmund 24 : 1-255 . (Year: 2017).*

* cited by examiner

DESIGNED EXPERIMENTS FOR APPLICATION VARIANTS

RELATED APPLICATIONS

This U.S. patent application claims priority to provisional U.S. Patent Application No. 63/184,549, entitled "DESIGNED EXPERIMENTS FOR APPLICATION VARIANTS," filed on May 5, 2021, the entirety of which is incorporated herein by reference.

TECHNICAL FIELD

The present disclosure relates to variants associated with an application, such as user interface (UI) variants and/or logic variants, particularly with respect to performing designed experiments associated with different variants of the application.

BACKGROUND

An application, such as a computer-executable application, may be configured to display a UI to users, process input data, and/or perform other operations. For instance, an application can process input data using a predictive model, a rule-based model, and/or other type of logic. As an example, when an insurance claim is submitted to an insurance company, an application may use a machine learning model, an artificial intelligence model, another type of predictive model, a rule-based model, and/or any other type of logic to automatically determine which downstream entity, such as a particular claim handler or group of claim handlers, should process the insurance claim. Such an application can accordingly cause insurance claims to be assigned to claim handlers more quickly than manually assigning insurance claims to claim handlers. In other examples, an application may be a user-facing application that can display a UI to users, such that the users can interact with the application via the UI.

Developers may generate new and different variants of an application over time. For example, developers may create one or more candidate UI variants for an application that the developers may consider displaying to users instead of a current UI. Similarly, if an application processes data using a current model, such as a predictive model, a rule-based model, or another type of model, developers may create one or more candidate model variants that could potentially be used in the application instead of the current model. For instance, developers may create new versions of an existing predictive model, create new predictive models based on new or different machine learning techniques, create new predictive models with different values of configurable parameters, train a new instance of a current predictive model on a different training dataset, create new rules for a rule-based model, and/or create any other type of new model or logic component for the application.

In many existing systems, new variants of an application are not tested in production environments alongside current versions of the application. For example, many existing systems would test a new predictive model variant by configuring the new predictive model variant to make predictions based on the same input data that a current predictive model is also using to make predictions. This can allow predictions made by the current predictive model and the new predictive model variant, both generated based on the same input data, to be directly compared against each other. However, generally only the predictions made by the current predictive model are followed in a production environment.

For example, a current predictive model can be configured to predict which claim handler should process an insurance claim. A new predictive model variant may be developed as a possible replacement for the current predictive model. In existing systems, the new predictive model may be tested in a non-production environment by having the new predictive model variant also predict which claim handler should process the insurance claim. However, although both the current predictive model and the new predictive model variant may make predictions for the same insurance claim, existing systems may only follow the prediction made by the current predictive model in a production environment, such that the insurance claim can be assigned to the claim handler indicated in the prediction made by the current predictive model.

In such existing systems, predictions made over time by a current predictive model and a new predictive model variant can be compared against each other directly to determine how the current predictive model and the new predictive model have performed relative to each other. For example, a data analyst may subjectively determine that predictions made over time by the new predictive model variant were better than corresponding parallel predictions made by the current predictive model. The data analyst may accordingly recommend replacing the current predictive model with the new predictive model variant in the production environment going forward.

However, if the new predictive model variant was not used in the production environment, and predictions made by the new predictive model variant during testing were not actually followed for real instances of input data, it may be unclear in existing systems what downstream effects would have occurred had the predictions made by the new predictive model variant actually been followed for real instances of input data. For example, it may be unclear whether differences between the current predictive model and the new predictive model variant, and the predictions generated by the respective predictive models, would have had different downstream effects if the predictions made by both predictive models had actually been put into action in a production environment.

In some examples, downstream effects can be related to processing times, reassignment metrics, and/or other key performance indicators (KPIs) reflecting how downstream entities handle input data after the input data is initially routed according to predictions made by predictive models. For instance, if an insurance claim is initially assigned to a first claim handler according to a prediction made by a predictive model, and that first claim handler later reassigns the insurance claim to a second claim handler, that reassignment may cause delays in fully processing the insurance claim, take time and effort of more than one claim handler, and/or lead to other negative downstream effects after the initial assignment of the insurance claim to the first claim handler. In this example, it may be unclear when a new predictive model is first developed whether the new predictive model will be more successful than a current predictive model at avoiding downstream reassignments of insurance claims, because predictions made by the new predictive model may not be followed for actual insurance claims in existing systems.

Accordingly, existing systems that test a new predictive model against an existing predictive model on the same input data, but only follow predictions made by the existing predictive model, may provide little to no data about relative downstream effects of the predictions made by each predictive model. Although a data analyst may subjectively determine that predictions made by one predictive model are better than predictions made by another predictive model, there may be no objective data indicating how the predictions made by each predictive model actually play out downstream. Accordingly, it may not be possible in existing systems to objectively determine which of multiple predictive models leads to improved downstream KPIs over time.

Other existing systems may be configured to use different UI variants or logic variants with respect to different users and/or different input data, for instance via A/B testing. However, generally such systems generally require the application to not only be reprogrammed to implement each of the variants, or interface with each of the variants, but also be specifically programmed or configured with information about each A/B test that is to be executed. For example, the application may need to be reprogrammed with logic for each experiment, so that the application itself can determine which specific users or data should be associated with which variant, and specifically track operations and results associated with each variant. This can take significant amounts of time and computing resources. For example, the application may need to be manually reprogrammed and recompiled for each experiment to implement distinct operations associated with the particular experiment. This may not only take time, especially if numerous experiments are to be run, but may also take a significant amount of processing cycles, memory usage, and/or other computing resources to recompile and/or redeploy the application with dedicated code for each individual experiment.

The example systems and methods described herein may be directed toward mitigating or overcoming one or more of the deficiencies described above.

SUMMARY

Described herein are systems and methods for performing designed experiments involving multiple variants of an application. The variants may be UI variants, logic variants, and/or other types of variants, any of which could be used by the application in a production environment. For example, the application may display different UI variants to different users during as part of a designed experiment, or use different logic variants to process different instances of unit data. In some examples, the designed experiment may be associated with different logic variants that are configured to predict which downstream entities should receive instances of unit data processed by the application. Such instances of unit data may represent insurance claims, customer service tickets, incoming customer service calls, or any other type of unit that could be assigned to any of a set of possible downstream entities for further processing. As part of a designed experiment, the application can operate according to different variants for different users and/or instances unit data. Over time, synchronous results and/or asynchronous results associated with the designed experiment can be collected and used to prove or disprove a hypothesis associated with the designed experiment. For example, if the hypothesis is that a new logic variant will lead to fewer downstream reassignments of insurance claims between different groups of claim handlers than will result from use of an existing default logic variant, and downstream data collected over time indicates that the new logic variant has led to fewer downstream reassignments of insurance claims than the existing default logic variant, the hypothesis of the designed experiment may be proven.

According to a first aspect, a computer-implemented method can include receiving, by one or more processors, context data associated with a unit data instance from an application. The application can be associated with a plurality of logic variants configured to select a downstream entity for the unit data instance from among a plurality of downstream entities. The method can additionally include determining that the context data matches an experiment definition of a designed experiment associated with the plurality of logic variants. The method can also include identifying, by the one or more processors, experiment tracking data associated with the designed experiment. The method can further include selecting, by the one or more processors, a selected logic variant, of the plurality of logic variants, based on one or more of the context data, the experiment definition, or the experiment tracking data. The method can also include transmitting, by the one or more processors, a variant identifier of the selected logic variant to the application, in response to the context data. The variant identifier can cause the application to use the selected variant to select the downstream entity for the unit data instance.

According to a second aspect, a computing device can include one or more processors and memory storing computer-executable instructions that, when executed by the one or more processors, cause the one or more computing devices to perform operations. The operations can include determining that a group of unit data instances qualify for a designed experiment associated with at least two variants of an application, based on an experiment definition associated with the designed experiment. The operations can also include selecting a first variant, of the at least two variants, for a first subset of the group of unit data instances, and causing the application to execute, in association with the first subset, based on the first variant. The operations can further include selecting a second variant, of the at least two variants, for a second subset of the group of unit data instances, and causing the application to execute, in association with the second subset, based on the second variant. The operations can also include collecting results associated with one or more of operations of the application in association with the group of unit data instances, or downstream treatment of the group of unit data instances by one or more downstream entities. The operations can additionally include identifying a success criteria associated with a hypothesis of the designed experiment, based on the experiment definition, and determining whether the results meet the success criteria. The operations can also include generating variant recommendation based on determining whether the results meet the success criteria.

According to a third aspect, one or more non-transitory computer-readable media can store computer-executable instructions that, when executed by one or more processors, cause the one or more processors to perform operations. The operations can include distributing a group of unit data instances among different model variants associated with a designed experiment, according to variant identifiers provided by a variant selector based on context data associated with the group of unit data instances. The operations can also include distributing the group of unit data instances among a set of downstream entities, available to receive unit data, based on model decisions generated by the different model variants. The operations can further include collecting downstream data indicating one or more downstream KPIs associated with downstream treatment of the group of unit data instances by the set of downstream entities. The operations can also include identifying a success criteria associated with a hypothesis of the designed experiment, based on an experiment definition associated with the designed experiment, and determining that the one or more downstream KPIs meet the success criteria. The operations can further include generating a model variant recommendation based on determining that the one or more downstream KPIs meet the success criteria.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
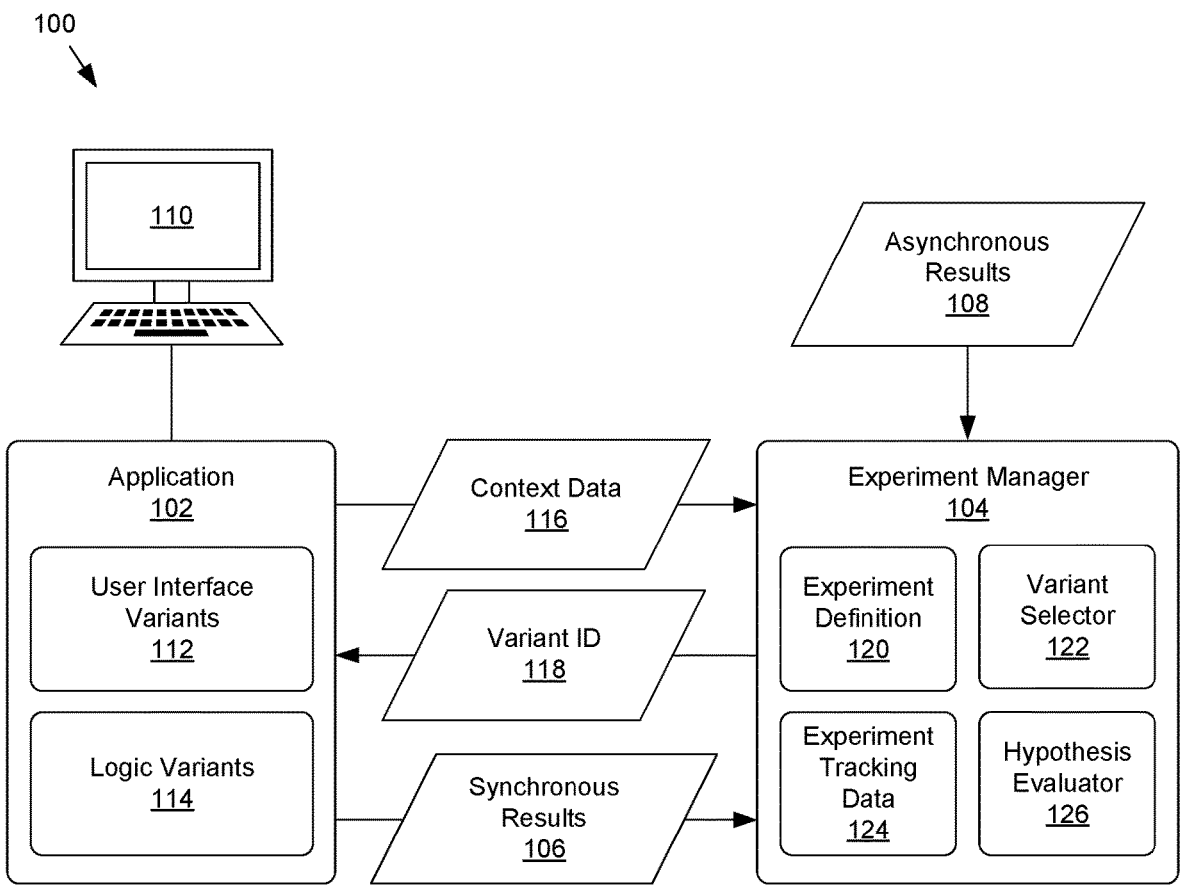
FIG. 1 shows a first example of a system for performing designed experiments related to variants of an application.

FIG. 1 shows a first example 100 of a system for performing designed experiments related to variants of an application 102. The variants can be alternative elements that the application 102 can use to display a UI and/or to process data, such as input data provided to the application 102. The system can include an experiment manager 104 configured to manage designed experiments that are associated with multiple variants of the application 102. During a designed experiment, the experiment manager 104 can select one of the variants of the application 102 for each user of the application, and/or for each instance of input data to be processed by the application 102. Accordingly, the application 102 can operate according to a selected variant in association with each user and/or instance of input data, and the application 102 may use the same or different variants in association with different users and/or different input data instances. The experiment manager 104 can also collect synchronous results 106, and/or asynchronous results 108, that occur based on operations of the application 102 according to selected variants over time. The synchronous results 106, and/or asynchronous results 108, can accordingly be analyzed to determine if a hypothesis associated with the designed experiment has been proven or disproven.

The application 102 may be a website, a web application, a mobile application, a local application, and/or any other type of software or computer-executable application. The application 102 may execute via one or more computing devices, such as the computing device 110 shown in FIG. 1. The computing device 110 may be a smartphone, a personal computer (PC) such as a laptop, desktop, or workstation, a server, a personal digital assistant (PDA), a media player, a tablet computer, a gaming device, a smart watch, or any other type of computing or communication device. An example system architecture for such a computing device is described below with respect to FIG. 6.

In some examples, the application 102 can execute on one or more remote computing devices, and a user can use a smartphone or other computing device to interact with the application 102 over the Internet or other data network. In other examples, the application 102 may execute locally on a user's computing device. In still other examples, the application 102 may be a non-user facing application, such as an application or automated backend system that automatically processes input data, for instance as discussed below with respect to FIG. 2.

In some examples, the variants associated with the application 102 may include UI variants 112. The application 102 may be configured to display selected UI variants 112 to users, via computing devices operated by the users, according to a designed experiment. Different UI variants 112 may differ in one or more ways, such as by including different colors, different fonts, different text strings, different images, different arrangements or layouts of UI elements, and/or other varying attributes.

In some examples, the variants associated with the application 102 may also, or alternately, include logic variants 114. The application may be configured to operate according to selected logic variants 114 to process data, such as input data provided to the application 102. Different logic variants 114 may be associated with different algorithms, different rule-based models, different predictive models, and/or any other type of differing logic.

For example, the logic variants 114 may include various different machine learning models, artificial intelligence models, and/or other types of predictive models. In some examples, such predictive model variants may be based on convolutional neural networks, recurrent neural networks, other types of neural networks, nearest-neighbor algorithms, regression analysis, Gradient Boosted Machines (GBMs), Random Forest algorithms, deep learning algorithms, and/or other types of artificial intelligence or machine learning frameworks.

In some examples, predictive model variants can be trained on a training set of historical data using a supervised machine learning approach. The historical data may include numerous data points associated with previous instances of data processed by the application 102. Such data points can be referred to as "features" for machine learning algorithms. Targets, goals, or optimal outcomes can be established for predictions made by the predictive model variants based on the historical data. Supervised learning algorithms may determine weights for different features, and/or for different combinations of features, from the training set that optimize prediction of the target outcomes. For instance, underlying machine learning algorithms can determine which combinations of features in the training set are statistically more relevant to predicting target outcomes, and/or determine weights for different features, and can thus prioritize those features in relative relation to each other. In some examples, after the predictive model variants have been trained, the trained predictive model variants can be used to infer probabilistic outcomes when the trained predictive model variants are presented with new data of the type on which they were trained, such as new input data provided to the application 102.

The logic variants 114 may additionally, or alternatively, include other types of logic variants 114, such as different static rule-based models associated with predefined rules and/or logic tree, different algorithms, different functions or other sets of programming instructions configured to process data in different ways, and/or other different logic variants 114. In some examples, the logic variants 114 may include one or more types of predictive models as well as one or more other types of logic variants 114, such as one or more rule-based models, and/or one or more functions based on one or more types of algorithms.

The application 102 can be configured to provide context data 116, associated with a user of the application 102 and/or an instance of input data being processed by the application 102, to the experiment manager 104. In some examples, the experiment manager 104 may expose an application programming interface (API) or other interface, which the application 102 can use to transmit context data 116 to the experiment manager 104 over the Internet and/or another data network.

The context data 116 may include name-attribute pairs or other information. The context data 116 may include information associated with a user, such as a name, an email address, an Internet Protocol (IP) address associated with the user's computing device, a web cookie associated with the user, and/or any other user identifier. In some examples, the context data 116 can similarly include a copy of an instance of input data being processed by the application 102, or information extracted or derived from the instance of the input data being processed by the application 102.

The experiment manager 104 can return a variant identifier 118 to the application 102 in response to the context data 116. For example, the experiment manager 104 can have an API that enables the application 102 to provide context data 116 to the experiment manager 104 and receive the variant identifier 118 from the experiment manager 104. The variant identifier 118 can identify a particular variant, of the variants associated with the application 102, that is selected by the experiment manager 104 based on the context data 116. For example, as will be discussed further below, the experiment manager 104 can select different variants associated with the application 102 for different users and/or different instances of input data as part of a designed experiment, and can return corresponding variant identifiers to the application 102. For instance, the variant identifier 118 may identify a selected UI variant of the UI variants 112, a selected logic variant of the logic variants 114, or another type of selected variant associated with the application 102. In some examples, if a designed experiment is associated with both UI variants 112 and logic variants 114, the experiment manager 104 may return both an identifier of a selected UI variant and an identifier of a selected logic variant. The application 102 can accordingly use the variant identifier 118 to display information to a user based on a selected UI variant identified by the variant identifier 118, or to process an instance of input data based on a selected logic variant identified by the variant identifier 118.

The experiment manager 104 can have an experiment definition 120 that defines attributes of the designed experiment. The experiment definition 120 may identify a set of two or more variants of the application 102 that are associated with the designed experiment, such as a specific set of UI variants 112 and/or logic variants 114. The experiment definition 120 may also indicate a hypothesis associated with the designed experiment, success criteria that, if satisfied, can indicate that the hypothesis is proven, a timeframe associated with the designed experiment, minimum and/or maximum numbers of users or input data instances that should be associated with the designed experiment overall and/or with respect to each of the identified variants, types of users and/or input data that are to be associated with the designed experiment, types of synchronous results 106 associated with the designed experiment, types of asynchronous results 108 associated with the designed experiment, sources of the synchronous results 106 and/or the asynchronous results 108, methods of obtaining the synchronous results 106 and/or the asynchronous results 108, models or algorithms that are to be used to evaluate the synchronous results 106 and/or the asynchronous results 108, and/or other information that defines attributes of the designed experiment.

As a non-limiting example, if the application 102 is a user-facing website, the experiment definition 120 may indicate a hypothesis that a first UI variant will lead to more user engagement with a particular link on the website than a second UI variant. The experiment definition 120 may also, or alternately, indicate success criteria for the designed experiment. For example, if the hypothesis is that the first UI variant will lead to more users clicking on the particular link than the second UI variant, success criteria in the experiment definition 120 may indicate that the hypothesis will be considered proven if synchronous results 106 and/or asynchronous results 108 indicate that, over a defined period of time, the first UI variant has led to more users clicking on the particular link than the second UI variant overall, by more than a threshold number of clicks, or by more than a threshold percentage of clicks.

In some examples, the experiment definition 120 may be based on one or more user-configurable files or other data that defines attributes of the designed experiment. For example, users may provide one or more configuration files that define one or more attributes of the experiment definition 120, or add or modify one or more attributes of the experiment definition 120 before or during the defined experiment.

The experiment manager 104 may be configured with multiple experiment definitions associated with multiple designed experiments, such that multiple designed experiments can be executed concurrently or at different or overlapping times. For instance, data scientists or other users can configure the experiment manager 104 with an experiment definition for each designed experiment to be executed in association with the variants of the application 102.

As an example, the experiment definition 120 shown in FIG. 1 may define attributes of a first designed experiment associated with a first set of two or more UI variants 112, but a second experiment definition (not shown) may define attributes of a second designed experiment associated with a different set of UI variants 112, while a third experiment definition (not shown) may define attributes of a third designed experiment associated with a set of two or more logic variants 114. In some examples, different experiment definitions may also be associated with different applications. For example, one experiment definition may define attributes of a designed experiment that is associated with two or more variants of a first application, while another experiment definition may define attributes of another designed experiment that is associated with two or more variants of a second application. Accordingly, the experiment manager 104 may execute multiple designed experiments, associated with one or more applications, based on different experiment definitions.

The experiment manager 104 may have a variant selector 122 that can select a particular variant for a user or a data instance, based on corresponding context data 116 provided by the application 102. For example, when the experiment manager 104 receives context data 116 associated with a user or an instance of unit data being processed by the application 102, the variant selector 122 can use experiment definitions to determine if the context data 116 matches criteria for any designed experiments. If the context data 116 does match criteria for a designed experiment defined by an experiment definition, the variant selector 122 can use the experiment definition to identify a set of two or more variants associated with the designed experiment, select one of those variants, and return a variant identifier associated with the selected variant to the application 102. The application 102 can thus operate, with respect to the user or data instance associated with the context data 116, based on the selected variant identified by the variant identifier 118.

In some examples, the variant selector 122 may randomly select a variant, from among a set of two or more variants associated with a designed experiment, for a particular user or data instance after receiving context data 116 indicating that the user or data instance qualifies for the designed experiment. In other examples, the variant selector 122 may select variants, from a set of variants associated with a designed experiment, for users or data instances on a round-robin basis or based on any other selection technique.

In some examples, the application may be associated with one or more external components (not shown) that can be configured to assist the variant selector 122 with selection of a variant. For example, a developer of the application 102 may implement an experiment helper component that executes on a server or other computing element, which may be different from the computing element that executes the application 102. In these examples, although the experiment manager 104 may be configured with the experiment definition 120 defining attributes of the designed experiment, the experiment helper component may be configured with additional qualifiers or rules that indicate which types of users or types of data are candidates for the designed experiment. In these examples, the variant selector 122 may use an API to call the experiment helper component to obtain additional information provided by the developer of the application 102 that may assist the variant selector 122 in selecting a variant in response to the context data 116. However, in other examples, the external experiment helper component may be absent, and the variant selector 122 can select the variant based on the experiment definition 120, and/or the experiment tracking data 124 described below, maintained by the experiment manager 104 itself.

The experiment manager 104 can maintain experiment tracking data 124 about each designed experiment. The experiment tracking data 124 can be stored in one or more databases, tables, or other data structures. The experiment tracking data 124 may indicate which variants the variant selector 122 selected for particular users and/or data instances. The experiment tracking data 124 can also track other information about ongoing designed experiments. For example, the experiment tracking data 124 can track how many users and/or data instances have been assigned to each variant associated with a designed experiment to date, how long a designed experiment has been in progress, and/or any other information associated with ongoing designed experiments, such as synchronous results 106 and/or asynchronous results 108 associated with a designed experiment.

As a non-limiting example, if the experiment definition 120 of a designed experiment indicates that at least 20,000 instances of unit data processed by the application 102 are to be associated with the designed experiment, the experiment manager 104 can use experiment tracking data 124 to track how many instances of unit data have been assigned to selected variants overall, and/or with respect to each of the variants, in association with the designed experiment. Accordingly, the experiment manager 104 can use the experiment tracking data 124 to determine when a sufficient number of instances of unit data have been assigned to variants of the application 102 in association with the designed experiment.

In some examples, when the variant selector 122 selects a variant for a user or a data instance, the variant selector 122 or another element of the experiment manager 104 can update the experiment tracking data 124 to identify which variant was selected for that user or data instance. For example, upon the variant selector 122 selecting a particular variant for a user or data instance, the experiment manager 104 can update the experiment tracking data 124 to increment a number of users or data instances that have been processed by the application 102 using the selected variant to date in association with a designed experiment. The experiment manager 104 may also, or alternately, update the experiment tracking data 124 to increment a total number of users or data instances that have been associated with the designed experiment to date. Accordingly, when the variant selector 122 receives new context data 116 associated with a new user or data instance, the variant selector 122 may use the experiment tracking data 124 to determine if a sufficient number of users or data instances have already been assigned to variants associated with a designed experiment, or if the variant selector 122 should select a variant for the new user or data instance in association with the designed experiment.

In some examples, the variant selector 122 may use the experiment tracking data 124 to determine if variants have already been selected for particular users or data instances as part of a designed experiment. For example, if the application 102 is a website, the experiment tracking data 124 may indicate that a third UI variant of the website was previously selected for a particular user. When the particular user next visits the website, context data 116 may identify the particular user and allow the variant selector 122 to determine, from the experiment tracking data 124, that the particular user previously viewed the third UI variant of the website. In some situations, the variant selector 122 may accordingly again select the third UI variant for the particular user, and provide the variant identifier 118 associated with the third UI variant to the website. The website can thus display the third UI variant to the particular user, in order to avoid confusing the particular user with different UI variants during different visits to the website.

The experiment tracking data 124 may also include stored copies of synchronous results 106 associated with designed experiments, and/or information derived from the synchronous results 106. The synchronous results 106 may be results provided by the application 102 to the experiment manager 104, or retrieved by the experiment manager 104 from the application 102, substantially immediately, or within a predetermined amount of time, after the variant identifier 118 is provided to the application 102 and the application 102 operates based on the selected variant. In some examples, the experiment definition 120 of a defined experiment may define one or more types of synchronous results 106 to be collected in association with the designed experiment, APIs or other mechanisms the experiment manager 104 can use to fetch or receive the synchronous results 106 from the application 104, and/or other information about the synchronous results 106.

Synchronous results 106 may be associated with operations or activities that occur during active use of the application 102 by a user, or during active processing of input data by the application 102. For example, if the variant identifier 118 identifies a particular selected UI variant, the application 102 can display the selected UI variant to a user substantially immediately. In this example, the synchronous results 106 may include data indicating how the user interacted with the application 102 in association with the selected UI variant. For instance, if the application 102 is a website and different UI variants 112 change the color of a button displayed on the website, synchronous results 106 may indicate metrics such as how often users click on the button when the users are served different UI variants 112 that include red or blue versions of the button, how many users click the button when served the different UI variants 112, how quickly users click the button when served the different UI variants 112, and/or other metrics associated with use of the different UI variants 112. Because users may interact with the application 102 differently based on different UI variants 112, while actively using the application 102, such metrics may be considered synchronous results 106.

The experiment tracking data 124 may also include stored copies of asynchronous results 108 associated with designed experiments, and/or information derived from the asynchronous results 108. In some examples, the asynchronous results 108 may be retrieved by the experiment manager 104 from the application 102 and/or other sources, or may be provided by such sources to the experiment manager 104, at least a predetermined amount of time after the variant identifier 118 is provided to the application 102 and the application 102 operates based on the selected variant. In other examples, the asynchronous results 108 may be obtained by the experiment manager 104 based on the occurrence of a trigger condition, such as data having been processed by the application 108 or another system according to a particular operation, or the data having reached a particular state or condition. In some examples, the experiment definition 120 of a defined experiment may define one or more types of asynchronous results 108 to be collected in association with the designed experiment, one or more sources of the asynchronous results 108, APIs or other mechanisms the experiment manager 104 can use to fetch or receive the asynchronous results 108 from the designated sources, and/or other information about the asynchronous results 108.

Asynchronous results 108 may be associated with other systems or processes that may be different or separate from the application 102. For example, the asynchronous results 108 may be associated with downstream systems or processes that may operate after a user interacts with the application 102, and/or after data is processed by the application 102, in association with a selected variant.

Figure 2:
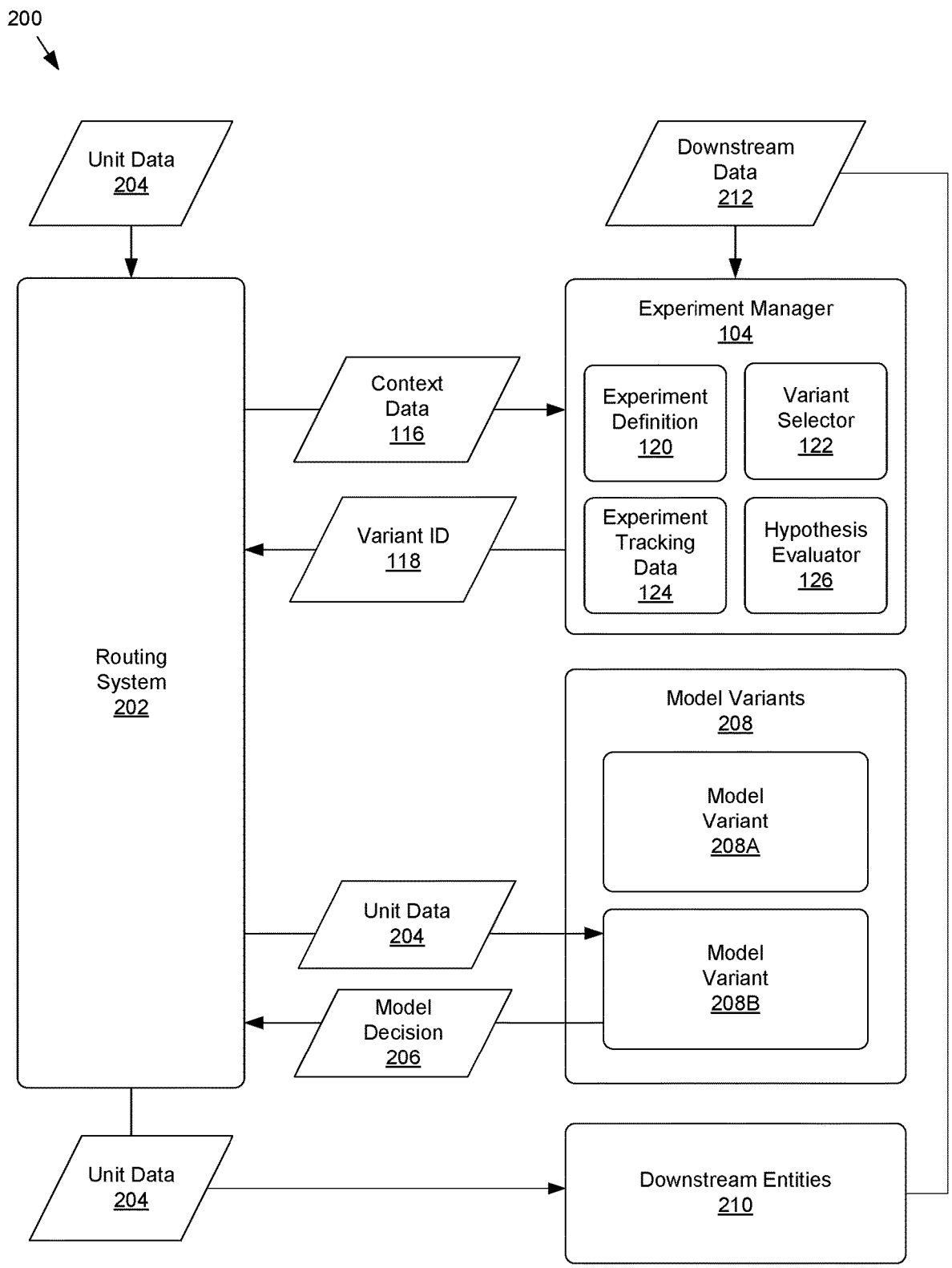
FIG. 2 shows a second example of a system for performing designed experiments related to variants of an application.

As an example, if the application 102 processes instances of input data in different ways according to different logic variants 114, and the instances of input data are then routed to other downstream systems based on decisions generated by the different logic variants 114, asynchronous results 108 may indicate metrics associated with how those downstream systems later processed the instances of input data. As another example, if the application presents different UI variants 112 to different users, the UI variants 112 may impact how a user interprets data presented via the UI variants 112, and in turn impact downstream decisions such as whether the user later chooses to purchase a product or sign up for a service. Asynchronous results 108 may accordingly track metrics associated with such later downstream systems and/or downstream activity that may occur after the user is actively using the application 102 or after the application 102 itself processes input data. FIG. 2, discussed further below, shows an example of asynchronous results 108 associated with downstream entities.

The experiment manager 104 may collect synchronous results 106 and/or asynchronous results 108 associated with a designed experiment over a period of time. In some cases, it may take days, weeks, months, or any other period of time for a sufficient amount of asynchronous results 108 to be collected for a designed experiment. For instance, asynchronous results 108 associated with a particular unit of data may not be ready until after a threshold period of time indicated by the experiment definition 102, or until one or more downstream entities have fully or partially processed the unit of data and the unit of data reaches a state that corresponds with a trigger condition indicated by the experiment definition 102. As an example, if the experiment definition 120 of a designed experiment indicates that at least 20,000 instances of unit data are to be associated with the designed experiment, the experiment manager 104 may wait until asynchronous results 108 associated with at least 20,000 instances of unit data associated with the designed experiment are available and are received before the designed experiment is considered complete and a hypothesis of the designed experiment can be proven or disproven.

The experiment manager 104 can have a hypothesis evaluator 126. In some examples, the hypothesis evaluator 126 can be a dashboard or other data reporting system that is configured to display information associated with the experiment definition 120 and/or experiment tracking data 124. For example, a data analyst or other user may use the hypothesis evaluator 126 to view summaries of synchronous results 106 and/or asynchronous results 108 associated with a designed experiment, view success criteria of a hypothesis of the designed experiment, and/or use such information to determine if the hypothesis has been proven or disproven.

In other examples, the hypothesis evaluator 126 can be configured to automatically determine whether a hypothesis associated with a designed experiment has been proven or disproven. For example, the hypothesis evaluator 126 may use the experiment definition 120 associated with the designed experiment to determine success criteria that indicates that the hypothesis of the designed experiment has been proven. The hypothesis evaluator 126 may also use collected experiment tracking data 124, for example including synchronous results 106 and/or asynchronous results 108, to determine whether the success criteria for the designed experiment has been met. In some examples, the experiment definition 120 of the designed experiment may indicate or define one or more models, such as statistical models, rule-based models, or machine learning models, or other algorithms or processes that the hypothesis evaluator 126 is to use to evaluate the synchronous results 106 and/or asynchronous results 108 to determine whether the success criteria for the designed experiment has been met.

As discussed above, the application 102 shown in FIG. 1 may be a user-facing application that can vary information presented to users according to different UI variants 112, and/or process input data differently accordingly to different logic variants 114. However, the application 102 shown in FIG. 1 may also be an automated system that is configured to automatically process input data according to different logic variants 114, in some cases without being actively operated by a user. FIG. 2 describes an example of such an automated application 102.

FIG. 2 shows a second example 200 of a system for performing designed experiments related to variants of an application 102. In example 200, the application 102 can be a routing system 202 that is configured to receive an instance of unit data 204 and determine a model decision 206 associated with that instance of unit data 204. The model decision 206 for the instance of unit data 204 can be generated by a model variant that is selected by the experiment manager 104 from a set of model variants 208 associated with the routing system 202. The model decision 206 generated by the selected model variant can indicate a particular downstream entity, out of a set of available downstream entities 210, that should receive and/or further process the instance of unit data 204.

The selected downstream entity indicated by the model decision 206 can, for instance, be a particular downstream system, process, individual, or group that can receive and/or further process the instance of unit data 204. As a non-limiting example, the unit data 204 may represent an insurance claim received by an insurance company, and the model decision 206 may indicate a specific department, team, and/or individual claim handler in the insurance company that can be assigned to process the insurance claim.

Accordingly, the routing system 202 or a corresponding system can route the instance of unit data 204 to the downstream entity indicated by the model decision 206. In some examples, the routing system 202 can route the unit data 204 to the downstream entity indicated by the model decision 206. In other examples, the routing system 202 can provide the model decision 206 to another system, such as a system that provided the unit data 204 to the routing system 202, such that the other system can route the unit data 204 to the downstream entity indicated by the model decision 206.

The routing system 202 can be associated with a set of two or more model variants 208, such as the first model variant 208A and the second model variant 208B shown in FIG. 2. The model variants 208 can be logic variants 114, such as different rule-based models and/or predictive models, that can process the unit data 204 and generate the corresponding model decision 206.

Over time, the experiment manager 104 can cause multiple model variants 208, associated with a designed experiment, to make model decisions for multiple instances of unit data received by the routing system 202. For example, the experiment manager 104 can cause a first set of unit data to be processed by the first model variant 208A, and also cause a second set of unit data to be processed by the second model variant 208B. As discussed above, the experiment manager 104 can also receive asynchronous results 108 associated with the designed experiment, including downstream data 212 associated with downstream results of model decisions generated by the model variants 208. For example, the downstream data 212 can indicate how instances of unit data were treated or processed by downstream entities 210, after the routing system 202 initially assigned the instances of unit data to selected downstream entities 210 based on corresponding model decisions. The experiment manager 104 can use the downstream data 212, and/or other experiment tracking data 124, to determine whether one or more of the model variants 208 has met success criteria associated with the designed experiment.

As discussed above, the routing system 202 can receive instances of unit data 204. Each instance of unit data 204 may indicate information about a particular unit, such as a particular insurance claim, a particular customer, a particular user, a particular product, a particular customer service ticket, or any other particular entity, item, or unit. The model variants 208 can be configured to generate a model decision based on the unit data 204. A model decision can indicate a downstream treatment, a downstream destination, a downstream routing decision, or other downstream processes or handling for the unit data 204. For example, the model decision 206 may identify a particular downstream entity, selected from a set of available downstream entities 210 or a set of candidate downstream entities 210, to which the unit data 204 can be routed. Model decisions for different instances of unit data may indicate that different instances of unit data should at least initially be assigned to different downstream entities 210. In some examples, a downstream entity can be an individual, or a group of individuals, that can be assigned to receive and/or further process the unit data 204. In other examples, a downstream entity can be another automated system or process that can receive and/or further process the unit data 204.

As a non-limiting example, the unit data 204 may represent an insurance claim received by an insurance company. For instance, the unit data 204 may be, or include, a "first notice of loss" (FNOL), another type of loss report, and/or other data associated with a submitted insurance claim. The unit data 204 may indicate information associated with an insured party and/or other individuals associated with the insurance claim, information about insurance policies associated with such individuals, location information associated with the insurance claim, time and date information associated the insurance claim, an insurance claim type, and/or other information about the insurance claim.

The unit data 204 for an insurance claim may be based on information reported by an individual, claimant, and/or other entities about a loss. For instance, an insured party who has experienced an accident or other a loss may call the insurance company to speak to a representative, and the representative can generate the unit data 204 based on information about the loss provided by the caller. The unit data 204 may also be based on information about an insurance claim provided directly by an individual through a website, mobile application, or other user interface. In some examples, the unit data 204 may additionally, or also, be based on information provided by other entities, such as a damage estimate associated with an automobile insurance claim provided by a body shop.

The insurance company can have claim handlers, claims adjustors, specialists, and/or other types of workers who perform tasks to process insurance claims. Such workers may be downstream entities 210, any of which could be assigned to process an insurance claim represented by the unit data 204. For instance, a claim handler may process an automobile insurance claim by performing tasks to determine whether parties have insurance coverage, determine how much insurance coverage the parties have, determine which party is at fault, determine if multiple parties are at fault in a comparative negligence situation, determine amounts to be paid to one or more parties, negotiate with insurers of other insured parties during subrogation situations, and/or take other actions to at least partially process and/or resolve the automobile insurance claim.

Such claim handlers and/or other workers may be grouped into different segments, tiers, divisions, departments, teams, and/or other groups within the insurance company. Such groups may be downstream entities 210, any of which could be assigned to process an insurance claim represented by the unit data 204. For example, for automobile and/or other property damage claims, the insurance company may have an "express" or "non-complex" group that is set up to handle relatively simple claims, a "tier 1" group that is set up to handle moderately complex claims, and a "tier 2" group that is set up to handle the most complex claims. The insurance company may also have different groups that specialize in different types of claims, such as different groups for automobile insurance claims, fire insurance claims, flood insurance claims, life insurance claims, home insurance claims, and/or other types of claims. The insurance company may also have one or more groups that specialize in certain types of issues associated with processing insurance claims. For example, the insurance company may have a particular group of workers who specialize in comparative negligence and/or subrogation issues. Insurance claims that may involve comparative negligence and/or subrogation issues can thus be handled by the comparative negligence and/or subrogation group, while other types of insurance claims can instead be handled by other groups.

Accordingly, in examples in which the unit data 204 represents an insurance claim, the model decision 206 generated by one of the model variants 208 may indicate a particular downstream entity for the insurance claim, such as a particular segment, tier, or other group, and/or a particular individual, that can be assigned to process the insurance claim. For instance, the model variants 208 may be machine learning models that are trained on historical data to predict, based on the unit data 204 about the insurance claim, which group and/or individual is best suited to process the insurance claim. The unit data 204 for the insurance claim can be routed, by the routing system 202 or another system, to the group and/or individual indicated in the model decision 206, such that the indicated group and/or individual can further process the insurance claim. Accordingly, in this example, the model variants 208 can cause instances of unit data for multiple insurance claims to be routed, assigned, or distributed to selected downstream entities 210, such as selected claim handling groups and/or claim handlers.

In other examples, the unit data 204 may represent any other type of entity, item, or unit that could be assigned to any of multiple downstream entities 210, based on a model decision generated by one of the model variants 208. For example, the unit data 204 may represent information about a caller who has called in to a call center. In this example, the model decision 206 may indicate a particular call center representative, selected from a group of call center representatives, who should be assigned to speak to the caller. As another example, the unit data 204 may represent a customer service ticket associated with a product or service. In this example, the model decision 206 may indicate a particular department, selected from different departments within a company, that should be assigned to resolve the customer service ticket.

The routing system 202 may be, or include, a gateway (not shown) that is configured to receive instances of unit data from another system or source. For instance, in examples in which the instances of unit data represent insurance claims, the gateway may receive the instances of unit data from a separate claim intake system that is configured to receive or store FNOLs, other loss reports, and/or other data associated with insurance claims. In other examples, the unit data can be new user input provided directly to the gateway of the routing system 202.

The routing system 202 can be configured to provide context data 116, associated with the unit data 204 received by the routing system 202, to the experiment manager 104. In some examples, the context data 116 can include name-attribute pairs or other information extracted or derived from the unit data 204 by the routing system 202. For instance, in examples in which the unit data 204 represents a particular insurance claim, the context data 116 may include location information associated with the insurance claim, time and date information associated the insurance claim, an insurance claim type, and/or other information about the insurance claim. In other examples, the context data 116 may be a copy of some or all of the unit data 204.

The experiment manager 104 can determine from the context data 116 that the unit data 204 qualifies to be processed as part of a designed experiment associated with the model variants 208. The variant selector 122 of the experiment manager 104 can accordingly select one of the model variants 208 for the unit data 204, and return the variant identifier 118 associated with the selected model variant to the routing system 202. The experiment manager 104 can select the same or different model variants 208 for different instances of unit data as part of one or more designed experiments associated with the routing system 202.

The routing system 202 can receive the variant identifier 118 from the experiment manager 104, and can provide the unit data 204 to the particular model variant identified by the variant identifier 118. The particular model variant can generate the model decision 206 based on the unit data 204, and can return the model decision 206 to the routing system 202. The model decision 206 can indicate a selected downstream entity for the unit data 204. The routing system 202 can accordingly cause the unit data 204 to be routed or assigned to the downstream entity indicated by the model decision 206. For instance, in examples in which the unit data 204 represents an insurance claim, the model decision 206 may indicate that the insurance claim should be assigned to a particular group of claim handlers. In some examples, the routing system 202 may accordingly route the unit data 204 to the group of claim handlers identified in the model decision 206. In other examples, the routing system 202 may provide the model decision 206 to a separate claim intake system, or other system, that initially provided the unit data 204 to the routing system 202, such that the claim intake system or other system can transmit the unit data 204 to the group of claim handlers identified in the model decision 206.

As discussed above, in some examples the model variants 208 may be logic variants 114 that include different machine learning models, artificial intelligence models, and/or other types of predictive models. For example, the model variants 208 may be based on convolutional neural networks, recurrent neural networks, other types of neural networks, nearest-neighbor algorithms, regression analysis, Gradient Boosted Machines (GBMs), Random Forest algorithms, deep learning algorithms, and/or other types of artificial intelligence or machine learning frameworks.

For instance, the model variants 208 can be predictive models trained on historical data identifying specific downstream entities 210 that were selected for previous instances of unit data. The historical data may also indicate other types of downstream data associated with previous instances of unit data. For example, the historical data may indicate that a previous instance of unit data representing a particular insurance claim was initially assigned to a tier 1 group within an insurance company, but was later reassigned by the tier 1 group to a tier 2 group. In this example, a claim handler in the initially-assigned tier 1 group may have manually evaluated the previous instance of unit data, may have determined that the insurance claim represented by the previous instance of unit data involved subrogation issues that the tier 2 group was more equipped to handle, and accordingly may have re-assigned the insurance claim to the tier 2 group for further processing. This type of historical data may allow the model variants 208 to be trained to identify similar types of insurance claims in the future that may also involve subrogation issues, and to output model decisions indicating that such insurance claims should be assigned to the tier 2 group instead of the tier 1 group.

The routing system 202 can be associated with at least two model variants 208 as part of a designed experiment, such as model variant 208A and model variant 208B shown in FIG. 2. Although two model variants 208 are shown in FIG. 2, in some examples the routing system 202 may be associated with more than two model variants 208. The model variants 208 may each be active alternative models in a production environment, any of which can be used to make a model decision based on an instance of unit data. However, different model variants 208 may vary in at least one way.

In some examples, different model variants 208 may be different types of machine learning or artificial intelligence models. As a non-limiting example, model variant 208A may be based on a neural network, while model variant 208B may be based on a Random Forest algorithm.

In other examples, different model variants 208 may be based on the same type of machine learning or artificial intelligence technique, but be different versions of the same model, be trained on different sets of training data, have different configurable parameters, and/or have other varied attributes. As a non-limiting example, model variant 208A and model variant 208B may both be based on neural networks, but may have different numbers of layers, different numbers of neurons at different layers, and/or have different values for other configurable hyperparameters.

In still other examples, the model variants 208 may be ensemble models that include different component models with varied attributes. Such ensemble models can generate final predictions, such as the model decision 206, based on combinations of predictions made by individual component models. In these examples, different model variants 208 may have different sets of component models, and/or be configured to combine predictions made by component models in different ways.

Additionally, the model variants 208 may also, or alternately, include other types of models and/or logic variants 114. For example, the model variants 208 may include, instead of or in addition to machine learning or artificial intelligence models, rule-based models, functions or programming instructions based on different algorithms, and/or other types of logic variants 114.

Two or more model variants 208 may be associated with a designed experiment implemented via the experiment manager 104 and the routing system 202. A designed experiment may be configured to prove or disprove a hypothesis associated with different model variants 208.

For example, the hypothesis of a designed experiment may be that model variant 208B will provide certain defined downstream benefits relative to model variant 208A. In this example, model variant 208A may be an existing default model variant in a production environment, while model variant 208B may be a new model variant that is being tested in the production environment using at least some actual instances of unit data. In some examples, the majority of instances of unit data received by the routing system 202 can be handled by the current default model variant 208A either outside the designed experiment or as part of the designed experiment, while the new model variant 208B can be provided with at least some other instances of unit data received by the routing system 202 according to the designed experiment.

In this example, the hypothesis may be that the new model variant 208B will lead to improved downstream benefits, relative to the current default model variant 208A, such that model variant 208B may be under consideration to become the new default model variant if the hypothesis is proven via the designed experiment. Accordingly, unit data and corresponding downstream data 212 associated with the current default model variant 208A can be considered as a control group for the designed experiment, while unit data and corresponding downstream data 212 associated with the new model variant 208B can be considered as an experimental group for the designed experiment. The control group and the experimental group can be associated with different sets of instances of unit data that share one or more aspects, such as unit data received during the same time frame, unit data associated with the same group of insured parties, unit data associated with the same geographic region, and/or any other similar aspects.

As a non-limiting example, if instances of unit data represent insurance claims, the experiment definition 120 may indicate that the designed experiment involves model variant 208A and model variant 208B, and that instances of unit data for automobile insurance claims related to losses that occurred in the state of California are subject to the designed experiment. In this non-limiting example, the experiment definition 120 may also indicate that the designed experiment should involve at least 10,000 insurance claims, and that model variant 208A and model variant 208B should each generate a model decision for at least 5,000 insurance claims.

As discussed above, the experiment definition 120 may also indicate a hypothesis associated with the designed experiment. For example, the experiment definition 120 may indicate a hypothesis that model variant 208B will lead to a reduction in downstream reassignments of insurance claims between downstream entities 210 relative to model variant 208A, or a hypothesis that model variant 208B will lead to faster determinations of liability by downstream entities 210 on average than model variant 208A. The experiment definition 120 can accordingly indicate types of downstream data 212 and/or other asynchronous results 108 that are to be collected from the downstream entities 210 or other sources, and that may be used to prove or disprove the hypothesis indicated by the experiment definition 120. The experiment definition 120 may also, or alternately, indicate success criteria for the designed experiment. For example, if the hypothesis is that model variant 208B will lead to a reduction in reassignments of insurance claims between downstream entities 210 relative to model variant 208A, success criteria in the experiment definition 120 may indicate that the hypothesis will be considered proven if downstream data 212 indicates that model variant 208B has led to a reduction in downstream reassignments relative to model variant 208A overall, by more than a threshold number of downstream reassignments, or by more than a threshold percentage.

The variant selector 122 can select a particular model variant for an instance of unit data, based on the context data 116 provided by the routing system 202 and the experiment definition 120. As a non-limiting example, if an experiment definition indicates that a particular designed experiment is associated with automobile insurance claims for multi-car accidents, and context data 116 indicates that an instance of unit data represents an insurance claim involving a multi-car accident, the variant selector 122 can determine that the instance of unit data qualifies to be a part of that particular designed experiment. The variant selector 122 may accordingly use the experiment definition to identify the specific model variants 208 associated with the designed experiment, select one of those model variants 208 for the instance of unit data, and return the variant identifier 118 associated with the selected model variant to the routing system 202 in response to the context data 116.

In some examples, the experiment tracking data 124 may include stored copies of downstream data 212 associated with designed experiments, or information derived from such downstream data 212. For example, after the variant selector 122 selects a particular model variant for an instance of unit data in association with a designed experiment, and the selected model variant generates a model decision for the instance of unit data that causes the routing system 202 to route the instance of unit data to a particular downstream entity, the experiment manager 104 can collect downstream data 212 indicating later downstream treatment of the instance of unit data.

The downstream data 212 may be asynchronous results 108 that indicate one or more KPIs associated with downstream treatment of instances of unit data, after the routing system 202 has routed the instances of unit data to downstream entities 210 based on model decisions generated by the model variants 208. For instance, in examples in which the instances of unit data represent insurance claims, KPIs in the downstream data 212 may indicate how many insurance claims were re-assigned after initially being routed to downstream entities 210 based on model decisions, an average cycle time taken to process or resolve the insurance claims, an average time for claims handlers to establish liability associated with the insurance claims, an average time to a first payment associated with the insurance claims, an average recovery amount associated with the insurance claims, and/or any other type of data indicating how the insurance claims were processed or treated at the downstream entities 210. In other examples, the downstream data 212 may indicate any other type of KPI associated with downstream treatment of instances of unit data. For instance, downstream data 212 may indicate customer survey results indicating customer satisfaction levels with particular downstream entities 210, timeline data indicating how quickly downstream entities 210 acted on unit data, re-assignment information indicating how often unit data was reassigned or transferred between downstream entities 210, and/or any other type of KPI associated with downstream treatment of instances of unit data.

As discussed above, the experiment definition 120 of the designed experiment can indicate types of downstream data 212 to be collected, one or more sources of the downstream data 212, such as the downstream entities 210, and/or mechanisms to fetch or otherwise receive the downstream data 212 from the indicated sources. In some examples, the experiment definition 120 may indicate threshold periods of time and/or trigger conditions associated with collection of the downstream data 212. As an example, if the hypothesis of the designed experiment is that model variant 208B will lead to a reduction in downstream reassignments of insurance claims between claim handling groups relative to model variant 208A, the experiment definition 120 may indicate that downstream data 212 associated with a particular insurance claim should be obtained after a period of time in which claim handling groups normally make liability decisions or other decisions, or once a trigger condition is met indicating that a liability decision has actually been made for the insurance claim. Accordingly, by waiting to obtain the downstream data 212 for the insurance claim until after the threshold period of time or until the occurrence of the trigger condition, any reassignments of the insurance claim are likely to already have occurred and thus be reflected in the downstream data 212.

In some examples, the hypothesis evaluator 126 may display the downstream data 212, experiment tracking data 124, experiment definition 120, and/or other data associated with a designed experiment in a dashboard or other UI. In other examples, the hypothesis evaluator 126 may be configured to automatically determine whether a hypothesis associated with a designed experiment has been proven or disproven. For example, the hypothesis evaluator 126 may use the experiment definition 120 associated with the designed experiment to determine success criteria indicating a hypothesis of the designed experiment has been proven. The hypothesis evaluator 126 may also use collected downstream data 212 associated with the designed experiment over a period of time to determine whether the downstream data 212 meets the success criteria for the designed experiment.

As a non-limiting example, the success criteria for the designed experiment may be that model decisions made by model variant 208B lead to fewer downstream reassignments than model decisions made by model variant 208A. In this example, the hypothesis evaluator 126 may collect a control group of data based on downstream reassignment KPIs in downstream data 212 associated with instances of unit data that were assigned to downstream entities 210 based on model decisions generated by model variant 208A. The hypothesis evaluator 126 may similarly collect an experimental group of data based on downstream reassignment KPIs in downstream data 212 associated with instances of unit data that were assigned to downstream entities 210 based on model decisions generated by model variant 208B. The hypothesis evaluator 126 can use the control group of data and experimental group of data to determine whether the model decisions generated by model variant 208B have led to fewer downstream reassignments of unit data than the model decisions generated by model variant 208A. For instance, if the downstream data 212 indicates that model decisions generated by model variant 208B has led to fewer downstream reassignments of unit data than model decisions generated by model variant 208A, the hypothesis evaluator 126 can determine that the success criteria for the designed experiment has been met, and thus that the hypothesis of the designed experiment has been proven. If model variant 208A is a current default model variant, and model variant 208B is a new model variant, determining that the hypothesis that model variant 208B leads to fewer downstream reassignments than model variant 208A has been proven may indicate that model variant 208B should be considered as a replacement for model variant 208A as the default model variant.

As another non-limiting example, the success criteria for the designed experiment may be that model decisions made by model variant 208B leads to at least five fewer downstream reassignments than model decisions made by model variant 208A over a predefined period of time. In this example, if KPIs in downstream data 212 indicate that model variant 208B has reduced the number of downstream reassignments relative to model variant 208A by only three over the predefined period of time, the hypothesis evaluator 126 can determine that the success criteria for the designed experiment has not been met even through model variant 208B did lead to fewer downstream reassignments than model variant 208A overall.

In some examples, the hypothesis evaluator 126 shown in FIG. 1 and FIG. 2, or another element of the experiment manager 104, can include a model that is trained or configured to recognize and/or account for noise within synchronous results 106, asynchronous results 108 (such as the downstream data 212), user data, and/or instances of data (such as the unit data 204) processed by the application 102 that may affect a determination of whether a hypothesis for a designed experiment can be proven or disproven. The hypothesis evaluator 126, or the other element of the experiment manager 104, can be based on a machine learning model, artificial intelligence model, rule-based model, and/or other type of model that is configured or trained to recognize or account for such noise.

In some examples, noise may be attributes of specific instances of unit data 204 that can affect downstream KPIs in the downstream data 212. As a non-limiting example, downstream data 212 may indicate that a new model variant leads to better downstream KPIs than an existing model variant for input data representing most types of insurance claims, but that the existing model variant leads to better downstream KPIs than the new model variant for a particular type of insurance claim, or for insurance claims associated with a particular location. The experiment manager 104 may be configured to detect such a disparity in how different model variants led to different KPIs in downstream data for different types of insurance claims. In some examples, the experiment manager 104 may account for the detected disparity when determining if a hypothesis is proven or disproven. In other examples, the experiment manager 104 may indicate that the hypothesis is proven for some types of input data and not for other types of input data. If the hypothesis is proven for some types of input data, but not other types of input data, that may indicate that one of the model variants 208 should re-trained or otherwise modified to better account for the types of input data that did not result in a proven hypothesis.

In other examples, noise may be attributes of the specific downstream entities 210 that can affect downstream KPIs in the downstream data 212. As a non-limiting example, downstream data 212 may indicate that a new model variant leads to better downstream KPIs than an existing model variant for input data when model decisions made by the model variants assign insurance claims to claim handlers with more than ten years of experience, but the existing model variant leads to better downstream KPIs than the new model variant when the model decisions assign insurance claims to less experienced claim handlers. The experiment manager 104 may be configured to detect such a disparity in how different model variants led to different KPIs in downstream data 212 based on the experience level of downstream claim handlers. In some examples, the experiment manager 104 may account for the detected disparity when determining if a hypothesis is proven or disproven. In other examples, the experiment manager 104 may indicate that the hypothesis is proven for some types of downstream entities 210 and not for other types of downstream entities 210. If the hypothesis is proven for some types of downstream entities 210 and not for other types of downstream entities 210, that may indicate that one of the model variants 208 should re-trained or otherwise modified to better account for the types of downstream entities 210 that did not result in a proven hypothesis.

Overall, objective asynchronous results 108, such as the downstream data 212, can indicate which of multiple variants associated with a designed experiment leads to improved downstream KPIs over time, and/or whether success criteria associated with the designed experiment has been met. In some situations, these types of objective conclusions based on actual asynchronous results 108 in a production environment may be more useful than subjective determinations about the performance of variants. Similarly, objective synchronous results 106 obtained based on actual user interactions with the application 102 based on different UI variants 112 and/or logic variants 114 may be more useful than subjective determinations about the performance of variants.

For example, even if a data analyst subjectively determines that a new model variant is expected to perform better than an existing model variant, differences between the two model variants 208 may not actually result in any improvements in KPIs objectively indicated by downstream data 212 associated with the model variants 208. For instance, if a new model variant makes subjectively better predictions than a current default model variant, but objective downstream data 212 indicates that the new model variant does not lead to improved downstream KPIs, there may be no appreciable downstream benefit to switching from the current model variant and making the new model variant the new default model variant.

If instead the new model variant does lead to improved downstream KPIs relative to the current default model variant, there may be an appreciable downstream benefit to switching from the current model variant to the new model variant even if there is little to no subjective difference between the performance of the current model variant and the new model variant. For example, switching from current model variant to the new model variant based on an objective determination that the new model variant has led to fewer downstream reassignments between downstream entities 210 may similarly reduce downstream reassignments in the future, which can in turn improve downstream processing times, reduce usage of computer resources to track and reassign instances of unit data downstream, and/or otherwise improve the system overall.

The processes discussed below with respect to FIGS. 3-5 can be used to implement designed experiments associated with multiple variants, collect synchronous results 106 and/or asynchronous results 108 associated with the multiple variants, and/or to determine whether a hypothesis associated a designed experiment has been proven or disproven. Such processes may be implemented via one or more computing devices, as discussed further below with respect to FIG. 6.

Figure 3:
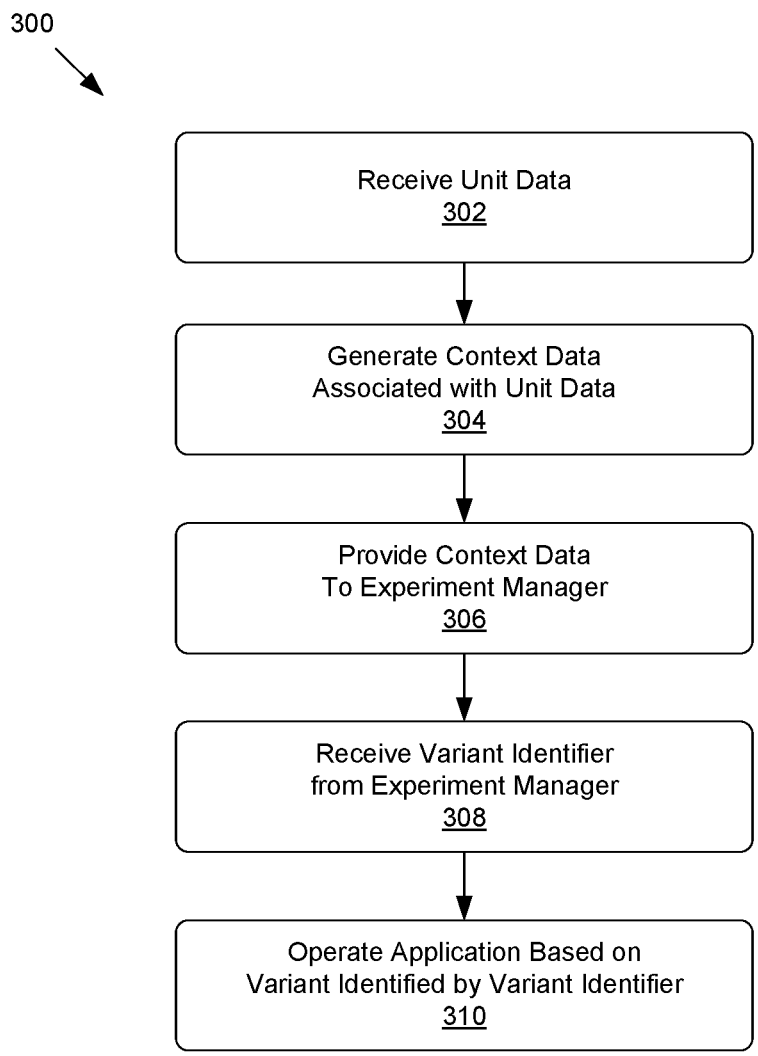
FIG. 3 shows a flowchart of an example process by which an application can operate according to a designed experiment.

FIG. 3 shows a flowchart of an example process 300 by which the application 102 can operate according to a designed experiment. At block 302, the application 102 can receive unit data. The unit data may indicate information about a particular unit, such as a particular insurance claim, a particular customer, a particular user, a particular product, a particular customer service ticket, or any other particular entity, item, or unit.

In some examples, the unit data may be input data received from another system or source, such as a claim intake system that receives FNOLs associated with insurance claims, or be new user input provided directly to the application 102. In these examples, the application 102 may be configured to process the unit data using any one of the logic variants 114 associated with the designed experiment. For example, the application 102 may be the routing system 202 shown in FIG. 2, and be configured to use any of the model variants 208 to process received unit data 204 and generate a corresponding model decision 206.

In other examples, the unit data may be a user identifier, and/or other user data, associated with a user of the application 102. In these examples, the application 102 may be configured to display any one of the UI variants 112 associated with the designed experiment to the user, and/or operate on user data, provided by the user or associated with the user, based on any one of the logic variants 114 associated with the designed experiment. For example, the application 102 may be a user-facing website or mobile application.

At block 304, the application 102 can generate context data 116 associated with the unit data received at block 302. The application 102 can also provide the context data 116 to the experiment manager 104 at block 306. The context data 116 may include name-attribute pairs or other information extracted or derived from the unit data. For instance, in examples in which the unit data represents an insurance claim, the context data 116 may include information derived from an FNOL or other data associated with the insurance claim, such as location information associated with the insurance claim, time and date information associated the insurance claim, an insurance claim type, and/or other information about the insurance claim. In other examples, the context data 116 provided to the experiment manager 104 at block 306 may be a copy of some or all of the unit data received by the application 102 at block 302.

At block 308, the application 102 can receive the variant identifier 118 from the experiment manager 104, in response to the context data 116 provided by the application 102 to the experiment manager 104 at block 306. As discussed above, the application 102 may be associated with multiple variants, such as UI variants 112 and/or logic variants 114. Different variants may each be active alternatives in a production environment, any of which could be used by the application 102 in association with the unit data. However, different variants may vary in at least one way. For example, the application 102 may be associated with different logic variants 114, such as model variants 208 that include different versions of the same predictive model, different types of predictive models, different ensemble models, predictive models trained on different historical data, predictive models having different configurable parameters, predictive models having any other varied attributes, and/or other types of models such as rule-based models. Different variants can be associated with different variant identifiers.

At least two of the variants of the application 102 may be associated with a designed experiment managed by the experiment manager 104. Accordingly, the variant identifier 118 received at block 308 can identify a particular variant selected by the experiment manager 104, out of a set of two or more variants associated with a designed experiment. For example, the experiment manager 104 may have determined from the context data 116 provided at block 306 that the unit data qualified for a particular designed experiment, identified the variants associated with the designed experiment, and randomly selected one of the variants associated with the designed experiment for the unit data. The experiment manager 104 may accordingly have sent the variant identifier 118 to the application 102 that identifies the variant selected by the experiment manager 104. Selection of variants by the experiment manager 104 is discussed in more detail below with respect to FIG. 4.

At block 310, the application 102 can operate according to the variant selected by the experiment manager 104. For example, the application 102 can use the variant identifier 118 received at block 308 to identify the variant selected by the experiment manager 104, and operate in association with the unit data based on the selected variant.

As an example, if the application 102 is the routing system 202 shown in FIG. 2, the routing system 202 provide the unit data, received at block 302, to a particular model variant indicated by the variant identifier 118. The routing system 202 can in turn receive a model decision from the particular model variant indicated by the variant identifier 118, which may indicate a particular downstream entity, out of a set of available downstream entities or candidate downstream entities, for the unit data received at block 302. For instance, there may be multiple possible downstream entities 210 that could be assigned to process the unit data, such as different customer service agents, different departments, different groups, different claim handlers or group of claim handlers, or other types of downstream destinations or downstream entities. The model decision can identify one of the possible downstream entities 210, according to a prediction made by the selected model variant based on the unit data.

In this example, the routing system 202 can cause the unit data to be routed to the downstream entity indicated by the model decision received from the model variant. In some examples, the routing system 202 can directly route the unit data, originally received at block 302, onward towards the downstream entity indicated by the model decision. In other examples, the routing system 202 can provide the model decision, or an indication of the downstream entity indicated by the model decision, to the source that provided the unit data to the routing system 202 at block 302. Accordingly, the routing system 202 can cause the source of the unit data to route the unit data to the downstream entity indicated by the model decision. As a non-limiting example, if the routing system 202 received unit data associated with an insurance claim from a separate claim intake system at block 302, at block 310 the routing system 202 can cause the claim intake system to route the unit data for the insurance claim on to a particular group or segment, identified by the model decision, within an insurance company for further processing.

As another example, if the application 102 is a website or other user-facing application, the application may receive a variant identifier at block 308 that identifies a particular UI variant selected by the experiment manager 104. At block 310, the application 102 can accordingly present a UI based at least in part on the selected UI variant to the user. Similarly, if the variant identifier received at block 308 identifies a particular logic variant selected by the experiment manager 104, the application 102 may process user interactions with the application 102, or other operations, according to the selected logic variant.

In some examples, unit data received at block 302 may not be associated with a designed experiment. For instance, the application 102 may provide context data 116 associated with the unit data to the experiment manager 104 at block 306. If the experiment manager 104 determines that the context data 116 does not meet criteria for any designed experiments that are currently in progress, the experiment manager 104 may return a variant identifier for a default variant at block 308. The application 102 can accordingly operate accordingly to the default variant at block 310.

The application 102 can repeat process 300 for multiple instances of unit data. Although the application 102 may not itself be configured with experiment definitions, the application 102 can be configured to operate according to different variants selected by the experiment manager 104 based on experiment definitions. Accordingly, the application 102 can be associated with any designed experiments, defined by experiment definitions stored at the experiment manager 104, that involve any two or more variants of the application 102. Selection of variants by the experiment manager 104 for instances of unit data, which the application 102 can follow, is discussed in more detail below with respect to FIG. 4.

Figure 4:
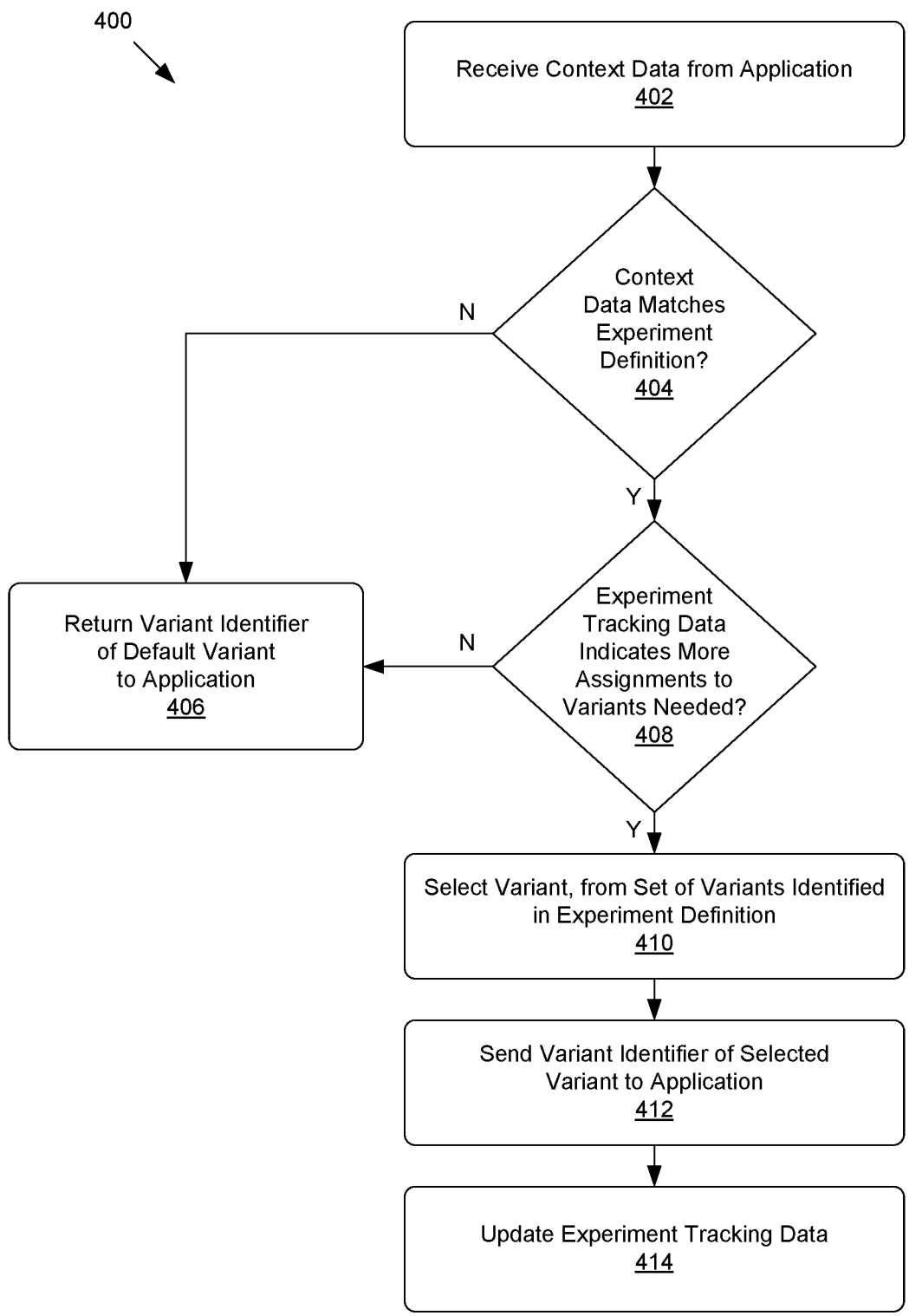
FIG. 4 shows a flowchart of an example process by which an experiment manager can implement one or more designed experiments associated with variants of an application.

FIG. 4 shows a flowchart of an example process 400 by which the experiment manager 104 can implement one or more designed experiments associated with variants of the application 102. The variants may each be active alternatives that could be used by the application 102 in a production environment, such as alternative UI variants 112 that could be presented to users, or alternative logic variants 114 that could be used by the application 102 to process data. However, different variants may vary in at least one way. For example, the application 102 may be associated with different logic variants 114, such as model variants 208 that include different versions of the same predictive model, different types of predictive models, different ensemble models, predictive models trained on different historical data, predictive models having different configurable parameters, predictive models having any other varied attributes, and/or other types of models such as rule-based models. A designed experiment may be associated with at least two different variants of the application 102, and may be defined by an experiment definition stored by the experiment manager 104. The experiment manager 104 may have multiple experiment definitions associated with different designed experiments. For instance, the experiment manager 104 may manage multiple designed experiments simultaneously that may involve the same or different variants of the application 102. The experiment manager 104 may also manage designed experiments associated with variants of one or more other applications in addition to the application 102.

At block 402, the experiment manager 104 can receive context data 116 from the application 102. In some examples, the context data 116 can include information associated with a user of the application 102. In other examples, the context data 116 may be a copy of data provided to, or being processed by, the application 102, and/or information extracted or derived from such data. For example, if the application 102 is the routing system 202 shown in FIG. 2, and receives unit data 204 representing an insurance claim, the context data 116 provided to the experiment manager 104 at block 402 may include name-attribute pairs or other information indicating location information associated with the insurance claim, time and date information associated the insurance claim, an insurance claim type, and/or other information about the insurance claim. In other examples, the context data 116 may be a copy of some or all of the unit data 204 forwarded by the routing system 202.

At block 404, the experiment manager 104 can determine whether the context data 116 received at block 404 matches any experiment definitions for currently-ongoing designed experiments managed by the experiment manager 104. For example, the experiment manager 104 may store experiment definitions that define attributes of one or more designed experiments, including types of user data or other data that may be associated with the designed experiments. The experiment manager 104 can accordingly determine whether the context data 116 matches a type of data associated with a designed experiment.

As a non-limiting example, if instances of unit data provided to the application 102 represent insurance claims, an experiment definition for a designed experiment can indicate that automobile insurance claims related to losses that occurred in the state of California may be subject to the designed experiment. In this example, if the context data 116 received at block 404 includes a "type" name-attribute pair indicating that the corresponding unit data is an automobile insurance claim and a "location" name-attribute pair indicating that the automobile insurance claim is associated with an accident that occurred in California, the experiment manager 104 can determine that the context data 116 matches the experiment definition for the designed experiment.

If the experiment manager 104 determines that the context data 116 received at block 404 does not match any experiment definitions (Block 404—No), the experiment manager 104 may return a variant identifier of a default variant to the application 102 at block 406. The variant identifier can cause the application 102 to operate based on the default variant, not as part of a designed experiment. For example, the application 102 may display a default UI variant to a user, or process data using a default logic variant. In example 200, shown in FIG. 2, the routing system 202 may route unit data 204 to a default model variant to be processed outside of a designed experiment.

If the experiment manager 104 instead determines that the context data 116 received at block 402 does match an experiment definition of a designed experiment (Block 404—Yes), the experiment manager 104 can determine at block 408 whether experiment tracking data 124 indicates that more assignments of data to variants of the application 102 are needed for the designed experiment. For example, an experiment definition associated with the routing system 202 shown in FIG. 2 may indicate that a designed experiment should involve at least 10,000 instances of unit data, and that model variant 208A and model variant 208B should each generate model decisions for different sets of at least 5,000 instances of unit data. In this case, if experiment tracking data 124 indicates that fewer than 10,000 instances of unit data have been processed as part of the designed experiment to date, or that one or both of model variant 208A and model variant 208B have not yet individually processed at least 5,000 instances of unit data as part of the designed experiment, the experiment manager 104 may determine that more assignments of unit data to one or more of the model variants 208 are needed for the designed experiment.

If the experiment manager 104 determines that a sufficient number of instances of users or data have already been associated with the designed experiment (Block 408—No), the experiment manager 104 may return the variant identifier of the default model variant to the application 102 at block 406. As discussed above, the variant identifier of the default variant can cause the application 102 to operate based on the default variant, not as part of the designed experiment, with respect to the user or data.

However, if the experiment manager 104 determines that more assignments of users or data to variants of the application 102 are needed for the designed experiment (Block 408—Yes), at block 410 the experiment manager 104 may select a particular variant from among a set of variants indicated in the experiment definition of the designed experiment. For example, the experiment definition may indicate that the designed experiment is associated with two or more logic variants 114, such as model variant 208A and model variant 208B shown in FIG. 2. Different variants associated with the designed experiment may be associated with a control group and an experimental group. In some examples, the variant selector 122 of the experiment manager 104 may randomly select a variant from the set of variants associated with the designed experiment. In other examples, the variant selector 122 of the experiment manager 104 may select a variant from the set of variants at block 410 in a round robin manner, or via any other selection technique.

At block 412, the experiment manager 104 can send a variant identifier, associated with the variant selected at block 410, to the application 102 in response to the context data 116 received at block 402. The variant identifier sent at block 412 can cause the application 102 to operate based on the selected variant in association with the user or data that corresponds to the context data received at block 402. For example, if the selected variant is a particular UI variant, the application 102 can display the selected UI variant to a user associated with the context data. If the selected variant is a particular logic variant, the application 102 can use the selected logic variant to process data associated with the context data. For instance, if the application 102 is the routing system 202 shown in FIG. 2, and the variant identifier is associated with a particular one of the model variants 208 that can generate a model decision for an instance of the unit data 204, the routing system 202 can route the unit data 204 associated with the context data to the model variant selected by the experiment manager 104 at block 412.

At block 414, the experiment manager 104 can update experiment tracking data 124 associated with the designed experiment, based on the selection of the variant at block 410. For example, if the designed experiment is associated with model variant 208A and model variant 208B, and the experiment manager 104 randomly selected model variant 208B at block 410, the experiment manager 104 may increment a count value associated with model variant 208B in the experiment tracking data 124 for the designed experiment. Accordingly, the experiment tracking data 124 can be updated to track how many instances of unit data have been provided to model variants 208 in association with the designed experiment overall, and to track how many instances of unit data have been provided to each individual model variant associated with the designed experiment.

The experiment manager 104 can repeat process 400 for multiple instances of context data 116, associated with multiple users or instances of unit data. For example, if a set of instances of context data 116 meet the same experiment definition, the experiment manager 104 may randomly select a first variant for a first subset of the instances of context data in association with a control group, and randomly select a second variant for a second subset of the instances of context data in association with an experimental group. By updating the experiment tracking data 124 at block 414 after selecting a variant for each instance of context data, the experiment manager 104 can determine whether a sufficient number of users or instances of unit data have been associated with each of the variants associated with the designed experiment.

Overall, the experiment manager 104 can cause the application 102 to operate, in association with different users and/or different instances of input data, based on selected variants associated with a designed experiment over time. As discussed in more detail below with respect to FIG. 5, the experiment manager 104 can also receive synchronous results 106 and/or asynchronous results 108 associated with the designed experiment. For example, the experiment manager 104 may receive asynchronous results 108 that include downstream data 212 indicating how instances of unit data were handled by downstream entities 210, after model variants 208 generated model decisions indicating initial assignments of downstream entities 210 for the instances of unit data. Such synchronous results 106 and/or asynchronous results 108 can allow the experiment manager 104 to determine whether a hypothesis associated with the designed experiment is proven or disproven.

Figure 5:
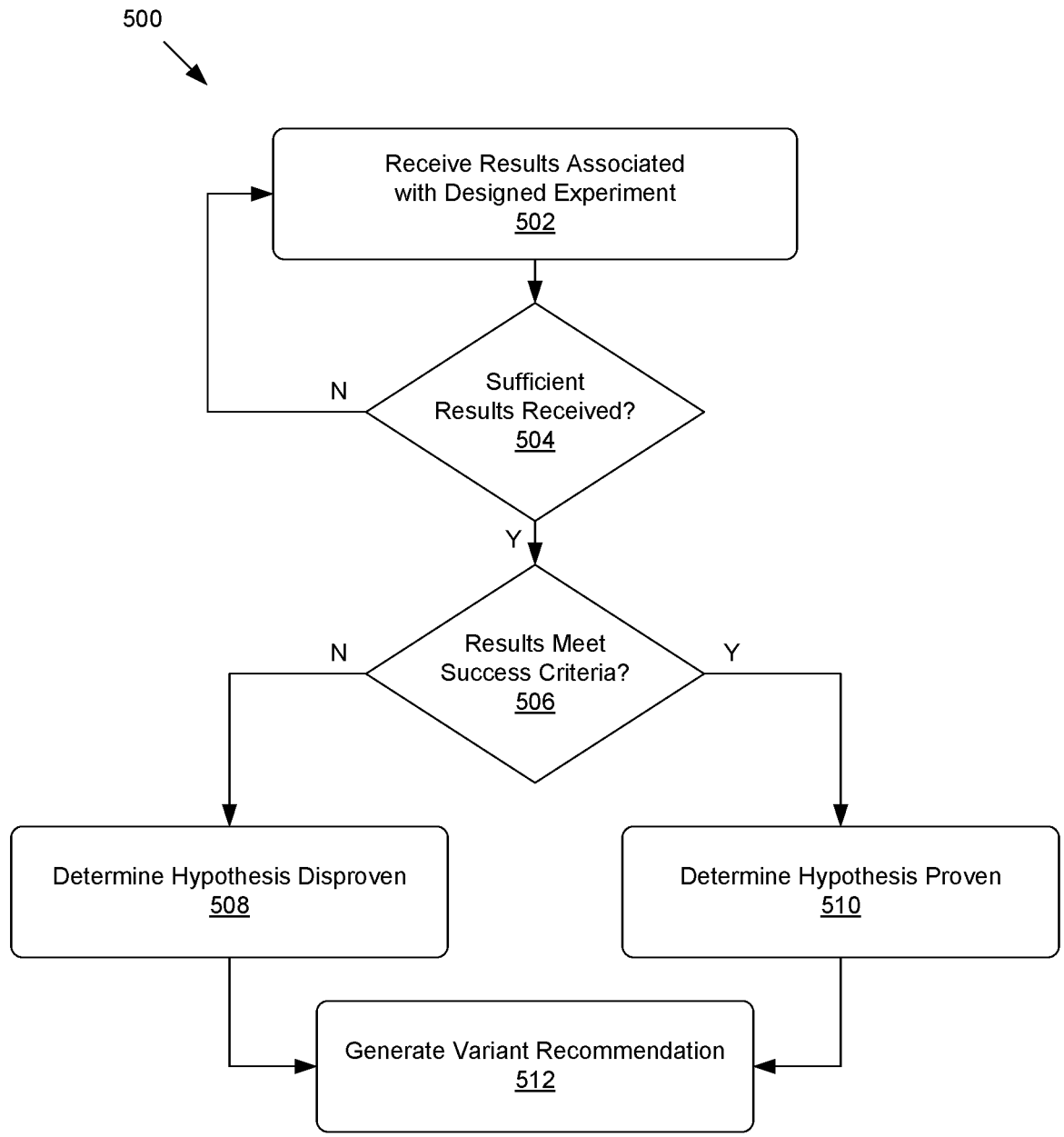
FIG. 5 shows a flowchart of an example process by which an experiment manager can process results of one or more designed experiments associated with variants of an application.

FIG. 5 shows a flowchart of an example process 500 by which the experiment manager 104 can process results of one or more designed experiments associated with variants of the application 102. At block 502, the experiment manager 104 can receive results associated with a designed experiment. The results received at block 502 can include synchronous results 106 and/or asynchronous results 108. The experiment definition 120 of a designed experiment can indicate what types of synchronous results 106 and/or asynchronous results 108 to obtain for the designed experiment, sources of the synchronous results 106 and/or asynchronous results 108, how the experiment manager 104 can obtain the synchronous results 106 and/or asynchronous results 108, and/or other information about the synchronous results 106 and/or asynchronous results 108.

Synchronous results 106 may include information indicating how the application 102 operated with respect to a particular user or instance of unit data based on a variant selected by the experiment manager 104. For instance, if a selected variant was a UI variant that the application 102 displayed to a user, synchronous results 106 may indicate how the user interacted with the UI variant while actively using the application 102.

Asynchronous results 108 may include information indicating how the application 102, and/or other systems or processes, were later impacted by the application 102 operating based on a variant selected by the experiment manager 104. For example, asynchronous results 108 may include downstream data 212 that indicates downstream results of model decisions generated by model variants 208 associated with the designed experiment. For instance, after the model variants 208 shown in FIG. 2 have generated model decisions indicating downstream entities 210 that should further process instances of unit data, and the routing system 202 has caused such instances of unit data to be sent to the downstream entities 210 indicated by the model decisions, the experiment manager 104 can receive downstream data 212 indicating how those downstream entities 210 and/or other downstream entities 210 later handled the instances of unit data.

The asynchronous results 108 received at block 402 may indicate one or more KPIs associated with downstream treatment of instances of unit data, or other downstream impacts of UI variants 112 and/or logic variants 114. For instance, in examples in which the instances of unit data represent insurance claims, KPIs in the downstream data 212 may indicate how many insurance claims were re-assigned after initially being routed to downstream entities 210 based on model decisions, an average cycle time taken to process or resolve the insurance claims, an average time for claims handlers to establish liability associated with the insurance claims, an average time to a first payment associated with the insurance claims, an average recovery amount associated with the insurance claims, and/or any other type of data indicating how the insurance claims were processed or treated at the downstream entities 210. In other examples, the asynchronous results 108 may indicate customer survey results indicating customer satisfaction levels with particular downstream entities 210, timeline data indicating how quickly downstream entities 210 acted on unit data, re-assignment information indicating how often unit data was reassigned or transferred between downstream entities 210, and/or any other type of KPI associated with downstream treatment of instances of unit data.

In some examples, synchronous results 106 received at block 402 may also indicate KPIs. For example, synchronous results 106 may indicate KPIs associated with how users interacted with UI variants 112 displayed by the application 102, such as metrics associated with how long users viewed the UI variants 112, how many times users interacted with elements of the UI variants 112, whether one UI variant was more successful at driving certain user behavior than another UI variant, and/or any other type of KPI.

At block 504, the experiment manager 104 can determine whether sufficient results have been received for the designed experiment. An experiment definition for the designed experiment may identify types of results that should be received for the designed experiment, and criteria for determining whether sufficient results have been received. In some examples, the experiment definition may indicate criteria for determining when sufficient results have been collected for a control group and for an experimental group associated with the designed experiment. As a non-limiting example, the experiment definition 120 may indicate that each individual logic variant associated with the designed experiment is to process at least 5,000 instances of unit data as part of the designed experiment. In this example, the experiment manager 104 can determine whether results have been received in association with at least 5,000 instances of unit data processed by each of the logic variants 114 associated with the designed experiment.

In some situations, the experiment manager 104 may determine that sufficient results have not yet been received for the designed experiment. For example, if an experiment definition for a designed experiment indicates that model variant 208A and model variant 208B should each process over 5,000 instances of unit data as part of the designed experiment, but so far downstream data 212 has only been received for 3,000 instances of unit data processed by model variant 208A and for 3,500 instances of unit data processed by model variant 208B, the experiment manager 104 may determine that sufficient downstream data 212 has not yet been received for the designed experiment. In this situation, experiment tracking data 124 may indicate that model variant 208A and model variant 208B have both individually processed over 5,000 instances of unit data as part of the designed experiment. However, downstream entities 210 may not yet have processed those instances of unit data, such that corresponding downstream data 212 is not yet available.

If the experiment manager 104 determines that sufficient results have not yet been received for the designed experiment (Block 504—No), the experiment manager 104 can wait to receive additional results associated with the designed experiment at block 504. For example, the experiment manager 104 may return to block 504 to wait for additional asynchronous results 108, as in some examples it may takes days, weeks, or months to collect sufficient asynchronous results 108 for a designed experiment after the designed experiment begins.

However, if the experiment manager 104 determines that sufficient results have been received for the designed experiment (Block 504—Yes), at block 506 the experiment manager 104 can determine if the results meet success criteria defined in the experiment definition of the designed experiment. The success criteria can be associated with a hypothesis of the designed experiment, and may indicate whether the hypothesis can be proven or disproven.

As a non-limiting example, if the hypothesis of the designed experiment is that model variant 208B will lead to a reduction in downstream reassignments of unit data between downstream entities 210 relative to model variant 208A, success criteria in the experiment definition may indicate that the hypothesis will be considered proven if downstream data 212 indicates that model variant 208B has led to a reduction in downstream reassignments relative to model variant 208A overall, by more than a threshold number of downstream reassignments, or by more than a threshold percentage.

As another non-limiting example, if the hypothesis of the designed experiment is that model variant 208B will lead to an overall reduction in downstream processing times relative to model variant 208A, success criteria in the experiment definition may indicate that the hypothesis will be considered proven if downstream data 212 indicates that model variant 208B has led to faster downstream processing times relative to model variant 208A overall, by more than a threshold period of time, or by more than a threshold percentage.

If the experiment manager 104 determines that the results do not meet the success criteria for the designed experiment (Block 506—No), the experiment manager 104 may determine that the hypothesis of the designed experiment has been disproven at block 508. If instead the experiment manager 104 determines that the results do meet the success criteria for the designed experiment (Block 506—Yes), the experiment manager 104 may determine that the hypothesis of the designed experiment has been proven at block 510. In some examples, the experiment manager 104 may generate output indicating a determination that the hypothesis has been proven or disproven, such as a user-readable report, user interface element, or other output that indicates that the hypothesis has been proven or disproven.

In some examples, the experiment manager 104 may generate a variant recommendation at block 512, based on a determination made at block 508 or block 510 that the hypothesis has been proven or disproven. As a non-limiting example, the designed experiment may involve a current default model variant and a new model variant that has been recently developed for the routing system 202 shown in FIG. 2, and the hypothesis of the designed experiment may be that the new model variant will reduce the number downstream reassignments of unit data relative to the current default model variant. If the hypothesis is proven, based on downstream data 212 indicating that the new model variant does lead to fewer downstream reassignments than the current default model variant, the experiment manager 104 may generate a variant recommendation that recommends decommissioning the current default model variant and having the routing system 202 use the new model variant as the new default model variant. If the hypothesis is instead disproven based on downstream data 212 indicating that the new model variant does not lead to fewer downstream reassignments than the current default model variant, or does not lead to fewer downstream reassignments by over a threshold amount defined by success criteria, the experiment manager 104 may instead generate a variant recommendation that recommends having the routing system 202 continue to use the current default model variant.

The systems described herein may implement processes 400, 500, and/or 600 using one or more computing devices. An example system architecture for such a computing device is described below with respect to FIG. 6.

Figure 6:
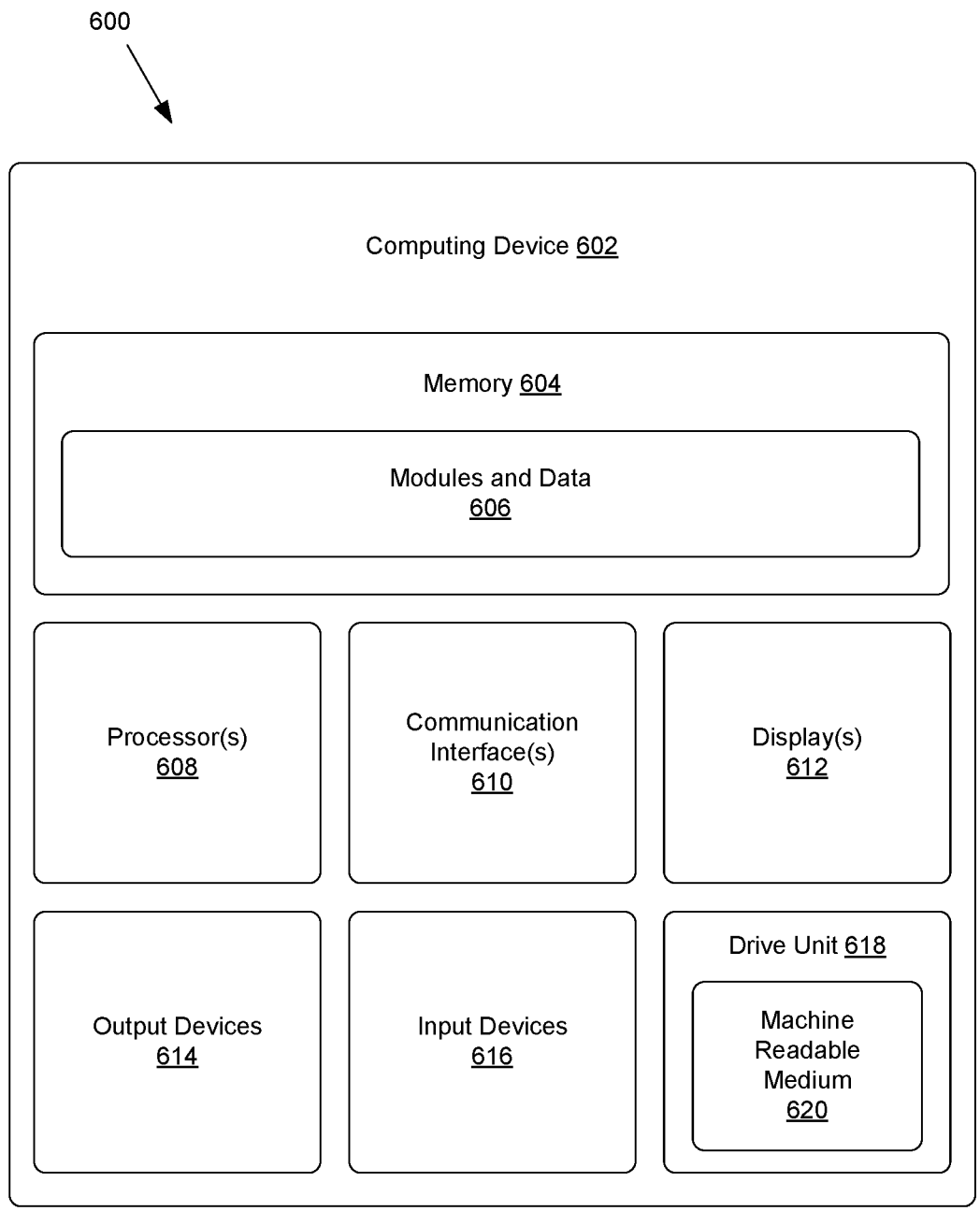
FIG. 6 shows an example system architecture for a computing device.

FIG. 6 shows an example system architecture 600 for a computing device 602 associated with the systems described herein. The computing device 602 can be a server, computer, or other type of computing device that executes at least a portion of the systems, such as one or more elements of the application 102, the experiment manager 104, and/or elements of individual variants of the application 102. In some examples, elements of the systems can be distributed among, and/or be executed by, multiple computing devices. For instance, in some examples, the application 102, the experiment manager 104, and/or elements of individual variants may be executed by different computing devices. As another example, the experiment manager 104 may be distributed among multiple computing devices, such that, for instance, the variant selector 122 may execute on one computing device and access experiment definitions stored on a different computing device.

The computing device 602 can include memory 604. In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 602. Any such non-transitory computer-readable media may be part of the computing device 602.

The memory 604 can store modules and data 606. The modules and data 606 can include data associated with the application 102, the variants of the application 102, the experiment manager 104, and/or other data. The modules and data 606 can also include any other modules and/or data that can be utilized by the computing device 602 to perform or enable performing any other actions. Such other modules and data can include a platform, operating system, and applications, and data utilized by the platform, operating system, and applications.

The computing device 602 can also have processor(s) 608, communication interfaces 610, displays 612, output devices 614, input devices 616, and/or a drive unit 618 including a machine readable medium 620.

In various examples, the processor(s) 608 can be a central processing unit (CPU), a graphics processing unit (GPU), both a CPU and a GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing computer applications stored in the memory 604, which can be associated with common types of volatile (RAM) and/or nonvolatile (ROM) memory.

The communication interfaces 610 can include transceivers, modems, interfaces, antennas, telephone connections, and/or other components that can transmit and/or receive data over networks, telephone lines, or other connections.

The display 612 can be a liquid crystal display or any other type of display commonly used in computing devices. For example, a display 612 may be a touch-sensitive display screen, and can then also act as an input device or keypad, such as for providing a soft-key keyboard, navigation buttons, or any other type of input.

The output devices 614 can include any sort of output devices known in the art, such as a display 612, speakers, a vibrating mechanism, and/or a tactile feedback mechanism. Output devices 614 can also include ports for one or more peripheral devices, such as headphones, peripheral speakers, and/or a peripheral display.

The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 620 can store one or more sets of instructions, such as software or firmware, that embodies any one or more of the methodologies or functions described herein. The instructions can also reside, completely or at least partially, within the memory 604, processor(s) 608, and/or communication interface(s) 610 during execution thereof by the computing device 602. The memory 604 and the processor(s) 608 also can constitute machine readable media 620.

Overall, the systems and processes described herein can allow multiple variants associated with the application 102 to be executed in a production environment as part of a designed experiment. The application 102 can be configured to operate according to different variants, but may not itself be configured to determine which users and/or data instances should be associated with which of those variants. Instead, the application 102 can be coded to make an API call to the experiment manager 104 that includes the context data 116, and receive the variant identifier 118 of one of the variants selected by the experiment manager 104. If the user or input data is not to be associated with a designed experiment, the experiment manager 104 may return a variant identifier of a default variant, and the application 102 can accordingly operate using the default variant with respect to that user or input data. However, if the experiment manager determines that the user or input data is to be associated with a designed experiment, the experiment manager 104 may return a variant identifier of a selected variant associated with that designed experiment, and the application 102 can accordingly operate using the selected variant with respect to that user or input data. Accordingly, the application 102 can be configured to make API calls to the experiment manager 104 for individual users or instances of data, but may not need to be specifically re-coded to itself determine which users or data should be associated with which designed experiments or to itself select between different variants for individual users or instances of data. As such, the systems and methods described herein can simplify development of the application 102 when one or more designed experiments are to be executed with respect to the application 102.

In addition, because different variants associated with the application 102 can be tested on different users and/or data instances in a production environment, actual results can be collected in association with a designed experiment that indicate how users actually interacted with different variants, how different variants actually processed data, and/or how different variants impacted other downstream systems. Such synchronous results 106 and/or asynchronous results 108 can be used to prove or disprove a hypothesis of the designed experiment, and thereby potentially indicate whether a new variant should be used by the application 102 instead of an existing variant going forward.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
receiving, by one or more processors, context data associated with a unit data instance from an application, wherein the application is associated with a plurality of logic variants configured to select a downstream entity for the unit data instance from among a plurality of downstream entities;
determining, by the one or more processors, that the context data matches an experiment definition of a designed experiment associated with the plurality of logic variants;
identifying, by the one or more processors, experiment tracking data associated with the designed experiment;
selecting, by the one or more processors, a selected logic variant, of the plurality of logic variants, based on one or more of the context data, the experiment definition, or the experiment tracking data; and
transmitting, by the one or more processors, a variant identifier of the selected logic variant to the application, in response to the context data,
wherein the variant identifier causes the application to use the selected logic variant to select the downstream entity for the unit data instance.

2. The computer-implemented method of claim 1, further comprising:
collecting, by the one or more processors, results associated with a set of context data associated with designed experiment, wherein the set of context data is associated with a plurality of unit data instances;
determining, by the one or more processors, that the results meet a success criteria associated with a hypothesis of the designed experiment; and
generating, by the one or more processors, a variant recommendation based on the results meeting the success criteria.

3. The computer-implemented method of claim 2, wherein the results include synchronous results provided by the application in association with the plurality of unit data instances.

4. The computer-implemented method of claim 2, wherein the results include asynchronous results associated with downstream treatment of the plurality of unit data instances by the plurality of downstream entities.

5. The computer-implemented method of claim 4, wherein:
the asynchronous results indicate downstream key performance indicators (KPIs) associated with a first logic variant and a second logic variant, and
the success criteria is associated with a difference between first downstream KPIs associated with the first logic variant and second downstream KPIs associated with the second logic variant.

6. The computer-implemented method of claim 5, wherein the first logic variant and the second logic variant are different machine learning predictive models.

7. The computer-implemented method of claim 1, wherein the experiment definition associated with the designed experiment indicates one or more of:
the plurality of logic variants associated with the designed experiment,
types of unit data instances associated with the designed experiment,
threshold numbers of the unit data instances to be associated with individual logic variants of the plurality of logic variants during the designed experiment, or
success criteria associated with the designed experiment, wherein the success criteria are associated with a hypothesis of the designed experiment.

8. The computer-implemented method of claim 1, wherein the experiment tracking data indicates one or more of:
numbers of previous unit data instances associated with individual logic variants of the plurality of logic variants during the designed experiment,
identifiers of the previous logic variants associated with the individual logic variants during the designed experiment,
a duration of the designed experiment, or
results associated with the designed experiment.

9. The computer-implemented method of claim 1, wherein the unit data instance represents an insurance claim, and the plurality of downstream entities comprises different claim handlers or groups of claim handlers that are available to process the insurance claim.

10. One or more computing devices, comprising:
one or more processors; and
memory storing computer-executable instructions that, when executed by the one or more processors, cause the one or more computing devices to perform operations comprising:
determining that a group of unit data instances qualify for a designed experiment associated with at least two variants of an application, based on an experiment definition associated with the designed experiment;
selecting a first variant, of the at least two variants, for a first subset of the group of unit data instances;
causing the application to execute, in association with the first subset, based on the first variant;
selecting a second variant, of the at least two variants, for a second subset of the group of unit data instances;
causing the application to execute, in association with the second subset, based on the second variant;
collecting results, associated with one or more of:
operations of the application in association with the group of unit data instances, or
downstream treatment of the group of unit data instances by one or more downstream entities;
identifying a success criteria associated with a hypothesis of the designed experiment, based on the experiment definition;
determining whether the results meet the success criteria; and
generating a variant recommendation based on determining whether the results meet the success criteria.

11. The one or more computing devices of claim 10, wherein determining that the group of unit data instances qualify for the designed experiment comprises:
determining context data associated with individual unit data instances of the group of unit data instances; and
determining that the context data matches criteria in the experiment definition.

12. The one or more computing devices of claim 11, wherein:
determining that the group of unit data instances qualify for the designed experiment further comprises determining that counter values associated with at least one of the first variant and the second variant are less than a minimum threshold value for the designed experiment, and the operations further comprise incrementing the counter values based on selecting the first variant for the first subset and selecting the second variant for the second subset.

13. The one or more computing devices of claim 10, wherein:
the group of unit data instances are associated with a group of users of the application,
the first variant is a first user interface variant, and
the second variant is a second user interface variant.

14. The one or more computing devices of claim 10, wherein the first variant and the second variant are different logic variants.

15. The one or more computing devices of claim 14, wherein the different logic variants are different machine learning predictive models.

16. One or more non-transitory computer-readable media storing computer-executable instructions that, when executed by one or more processors, cause the one or more processors to perform operations comprising:
determining that a group of unit data instances qualify for a designed experiment associated with at least two model variants associated with an application, based on an experiment definition associated with the designed experiment;
selecting different model variants, of the at least two model variants, in association with different subsets of the group of unit data instances;
causing the different model variants to execute, in association with the different subsets of the group of unit data instances, wherein the different model variants generate model decisions, corresponding to individual unit data instances of the group of unit data instances, that identify particular downstream entities, of a set of downstream entities, that are to receive the individual unit data instances;
distributing the group of unit data instances among the set of downstream entities, based on the model decisions generated by the different model variants;
collecting downstream data indicating one or more downstream key performance indicators (KPIs) associated with downstream treatment of the group of unit data instances by the set of downstream entities;
identifying a success criteria associated with a hypothesis of the designed experiment, based on the experiment definition associated with the designed experiment;
determining that the one or more downstream KPIs meet the success criteria; and
generating a model variant recommendation based on determining that the one or more downstream KPIs meet the success criteria.

17. The one or more non-transitory computer-readable media of claim 16, wherein the success criteria are associated with a difference between the one or more downstream KPIs associated with the different model variants.

18. The one or more non-transitory computer-readable media of claim 16, wherein the different model variants are different machine learning predictive models.

19. The one or more non-transitory computer-readable media of claim 16, wherein the group of unit data instances represent insurance claims, and the set of downstream entities are associated with different groups of claim handlers or individual claim handlers.

20. The one or more non-transitory computer-readable media of claim 19, wherein the one or more downstream KPIs represent one or more of:
numbers of downstream reassignments between the different groups of claim handlers or the individual claim handlers,
processing times of the insurance claims,
times to first payments associated with the insurance claims,
times to liability determinations associated with the insurance claims, or
recovery amounts associated with the insurance claims.

* * * * *